United States Patent [19]

Nagler et al.

[11] Patent Number: 5,592,309
[45] Date of Patent: Jan. 7, 1997

[54] MULTIPLE LENS SEPARATION SCANNER

[75] Inventors: Michael Nagler, Tel Aviv; Haim Melman, Kfar Saba; Moshe Yanai, Alfei Menashe; Amir Kleinstern, Kiron; Eliayahu Shalev, Kfar Saba, all of Israel

[73] Assignee: Scitex Corporation Ltd., Herzliya, Israel

[21] Appl. No.: 293,087

[22] Filed: Aug. 19, 1994

Related U.S. Application Data

[63] Continuation of Ser. No. 652,545, Feb. 8, 1991, which is a continuation-in-part of Ser. No. 670,950, Mar. 18, 1991, Pat. No. 5,325,217, which is a continuation of Ser. No. 44,428, Apr. 30, 1987, abandoned.

[30] Foreign Application Priority Data

May 2, 1986 [IL] Israel ............................................. 78675
Feb. 13, 1990 [IL] Israel ............................................. 93368

[51] Int. Cl.⁶ ............................... H04N 1/04; H04N 1/46; G02B 7/02
[52] U.S. Cl. ........................ 358/500; 358/482; 358/513; 358/515; 359/819
[58] Field of Search ..................... 358/42, 43, 53, 358/213.11, 225, 226, 209, 482, 483, 512, 513, 506, 515; 359/694, 697, 809, 822, 819, 210; 382/318, 319; H04N 1/04, 1/46; G02B 7/02

[56] References Cited

U.S. PATENT DOCUMENTS

| | | | |
|---|---|---|---|
| 2,881,247 | 4/1959 | Levine et al. | 358/496 |
| 2,911,463 | 11/1959 | Kretzmer | 358/436 |
| 3,646,255 | 2/1972 | Markow | 358/486 |
| 4,178,064 | 12/1979 | Mrdjen | 359/215 |
| 4,214,157 | 7/1980 | Check | 358/302 |
| 4,256,969 | 3/1981 | Lianza | 358/80 |

(List continued on next page.)

FOREIGN PATENT DOCUMENTS

| | | |
|---|---|---|
| 0006570 | 1/1980 | European Pat. Off. . |
| 0021096 | 1/1981 | European Pat. Off. . |
| 0043721 | 1/1982 | European Pat. Off. . |
| 0049048 | 4/1982 | European Pat. Off. . |
| 0054170 | 6/1982 | European Pat. Off. . |
| 0065242 | 11/1982 | European Pat. Off. . |
| 0091798 | 10/1983 | European Pat. Off. . |
| 0112403 | 7/1984 | European Pat. Off. . |
| 0142833 | 5/1985 | European Pat. Off. . |
| 0144188 | 6/1985 | European Pat. Off. . |

(List continued on next page.)

OTHER PUBLICATIONS

Bestenreiner et al, Visibility and Correction of . . . , Journal of App. Photo. Eng., vol. 2, No. 2, Spring 1976—86–92.
S. Bousky et al, Laser Recording Performance . . . , SPIE, vol. 84, Laser Scanning Components & Techniques, 1976 pp. 69–76.
D. P. Jablonowski et al, Beam Deflection . . . , SPIE vol. 84, Laser Scanning Components and Techniques, 1976. pp. 69–76.
M. R. Smith et al, Ultrahigh Resolution Graphic Data Terminal, SPIE vol. 200 Laser Recording and Information Handling, 1979, pp. 171–178.
S. Bousky et al, Laser Recording Performance . . . , Proc. of the SPIE, vol. 53,.

*Primary Examiner*—Kim Yen Vu
*Assistant Examiner*—Kimberly A. Williams
*Attorney, Agent, or Firm*—Ladas & Parry

[57] ABSTRACT

A color separation scanner comprising a support arranged for mounting thereon of a two-dimensional image to be scanned and color separation sensing apparatus arranged for sensing the two-dimensional image. The color separation apparatus includes a scanning head located a fixed distance from the two-dimensional image, at least first and second objective lens assemblies and apparatus for selectively arranging each of the at least first and second objective lens assemblies in fixed locations along the optical path between the image and the scanning head.

10 Claims, 39 Drawing Sheets

DETAIL A

U.S. PATENT DOCUMENTS

| | | | |
|---|---|---|---|
| 4,293,202 | 10/1981 | Ohnishi | 346/108 |
| 4,305,094 | 12/1981 | Yamada | 358/515 |
| 4,346,295 | 8/1982 | Tanaka et al. | 355/88 |
| 4,394,089 | 7/1983 | McIntosh et al. | 355/88 |
| 4,408,826 | 5/1986 | Ike | 358/75 |
| 4,464,681 | 8/1984 | Jacobs et al. | 358/406 |
| 4,473,848 | 9/1984 | Juergensen | 358/484 |
| 4,518,988 | 5/1985 | Saitoh | 358/75 |
| 4,525,823 | 6/1985 | Sugiyama | 250/202 |
| 4,532,429 | 7/1985 | Horikawa | 359/217 |
| 4,558,357 | 12/1985 | Nakagawa et al. | 358/75 |
| 4,568,984 | 2/1986 | Juergensen | 358/484 |
| 4,591,904 | 5/1986 | Urabe | 250/559 |
| 4,602,154 | 7/1986 | Taniguchi | 250/227.11 |
| 4,609,818 | 9/1986 | Lennemann | 250/234 |
| 4,617,470 | 10/1986 | Horikawa | 250/561 |
| 4,661,699 | 4/1987 | Welmers | 358/499 |
| 4,672,461 | 6/1987 | Yoshida | 358/453 |
| 4,687,944 | 8/1987 | Mitsuka | 358/451 |
| 4,709,144 | 11/1987 | Vincent | 250/226 |
| 4,751,376 | 6/1988 | Sugiura et al. | 250/201.8 |
| 4,835,600 | 5/1989 | Harada et al. | 358/514 |
| 4,879,579 | 11/1989 | Yamamoto et al. | 355/235 |
| 5,329,384 | 7/1994 | Setani et al. | 358/514 |

FOREIGN PATENT DOCUMENTS

| | | | |
|---|---|---|---|
| 0164734 | 12/1985 | European Pat. Off. . | |
| 0209119 | 1/1987 | European Pat. Off. . | |
| 0265362 | 4/1988 | European Pat. Off. . | |
| 0303960 | 2/1989 | European Pat. Off. . | |
| 0335364 | 10/1989 | European Pat. Off. . | |
| 1922615 | 1/1970 | Germany . | |
| 2949102 | 6/1980 | Germany . | |
| 3129503 | 4/1982 | Germany . | |
| 3435538 | 4/1986 | Germany . | |
| 44263 | 4/1981 | Japan . | |
| 100568 | 6/1983 | Japan . | |
| 194868 | 11/1983 | Japan . | |
| 60-079372 | 5/1985 | Japan . | |
| 60-079355 | 5/1985 | Japan . | |
| 0171862 | 9/1985 | Japan | 358/483 |
| 197957 | 10/1985 | Japan . | |
| 63-091790 | 9/1988 | Japan . | |
| 11425411 | 6/1989 | Japan . | |
| 1238368 | 9/1989 | Japan . | |
| 1267632 | 10/1989 | Japan . | |
| 2085580 | 4/1982 | United Kingdom . | |
| 2114853 | 8/1983 | United Kingdom . | |
| 2139846 | 11/1984 | United Kingdom . | |

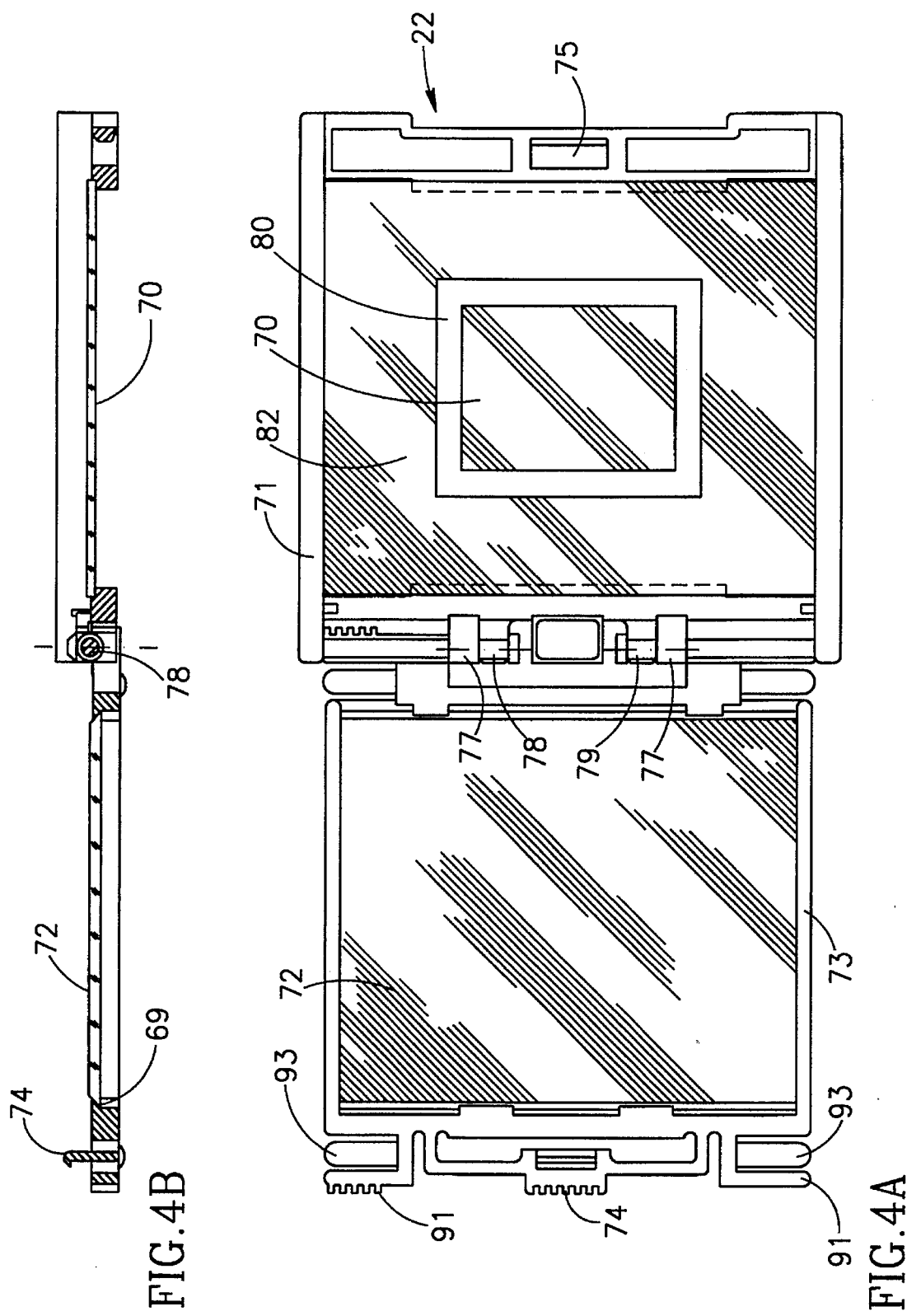

DETAIL A

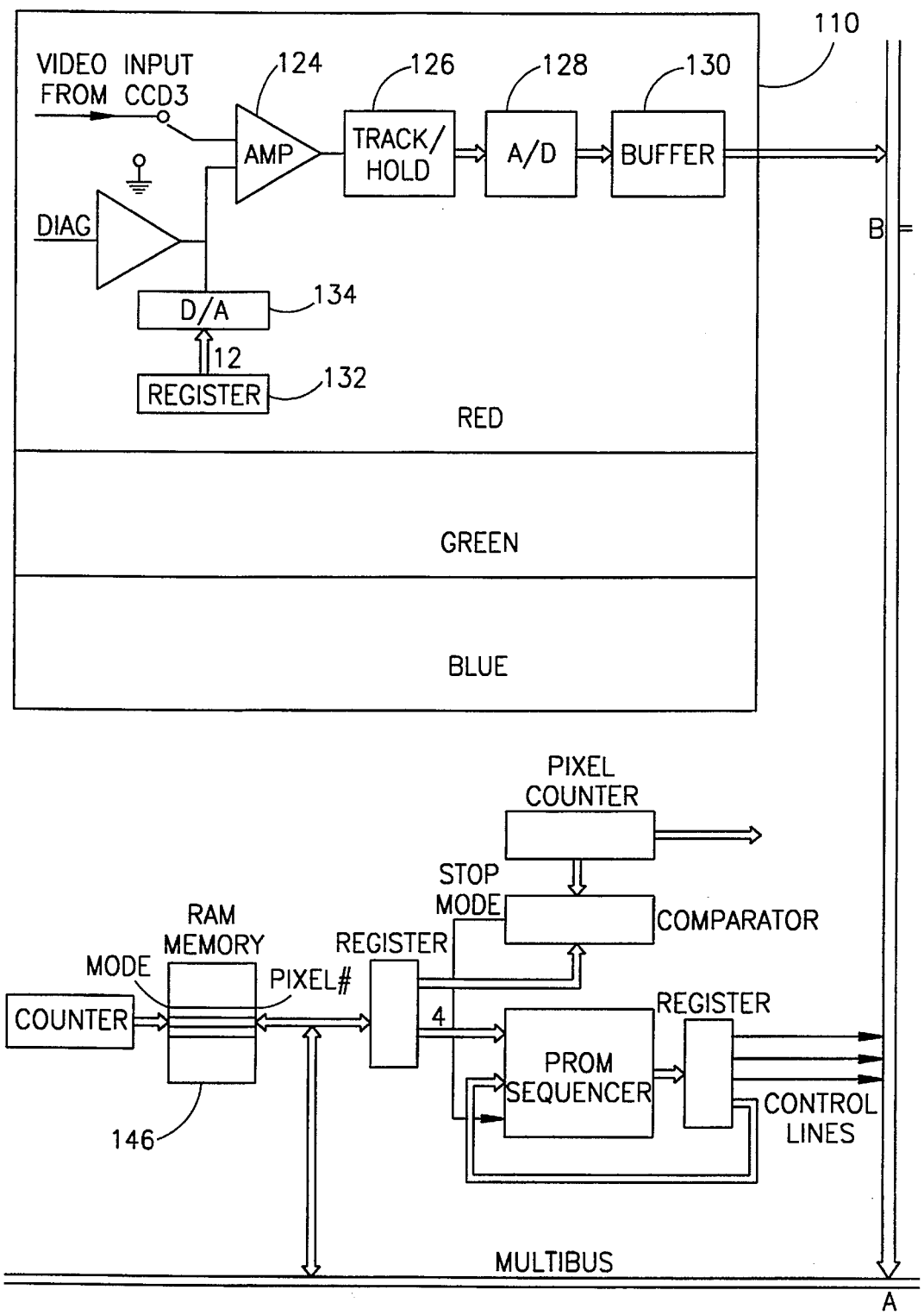
FIG.19/1

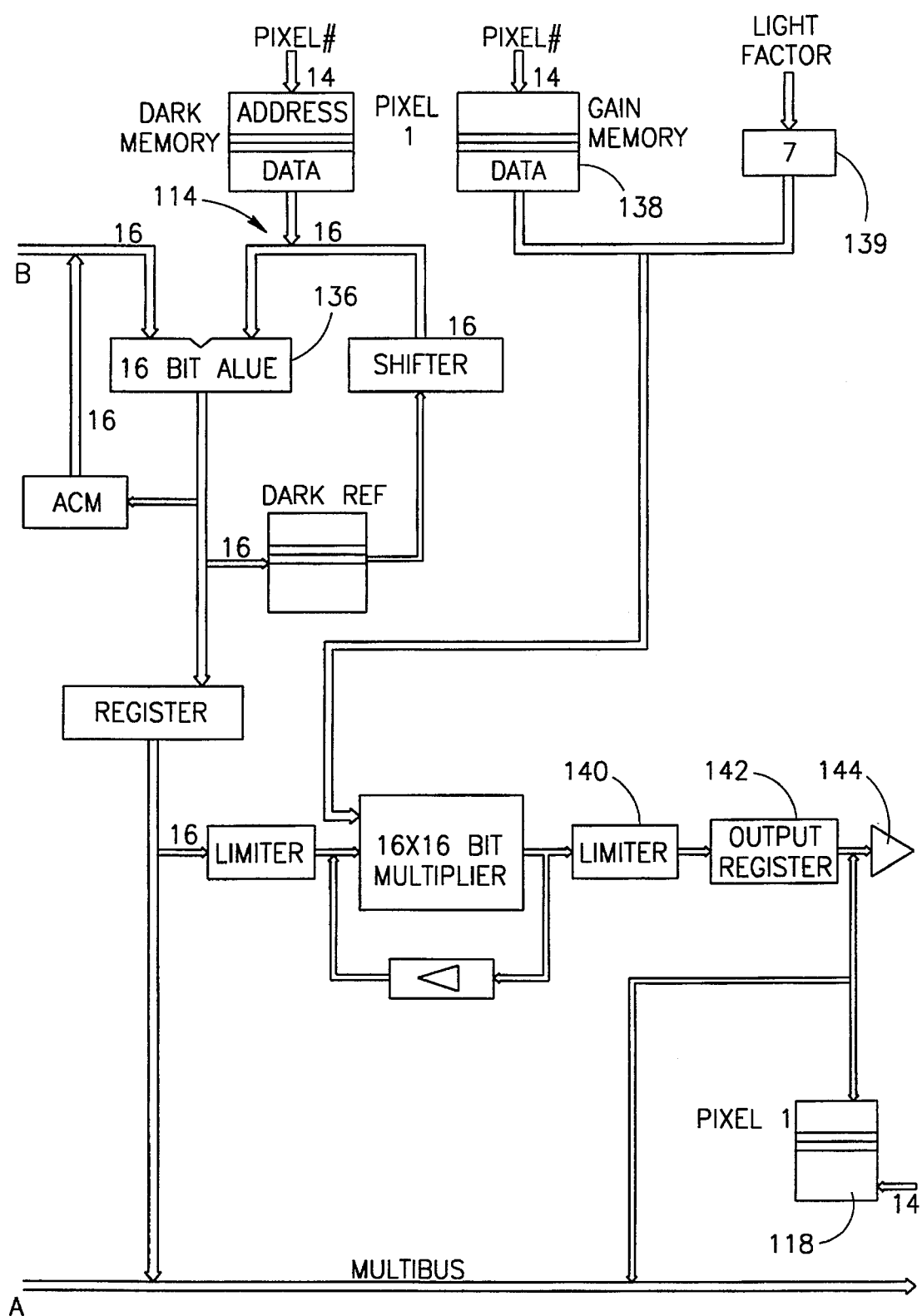
FIG.19/2

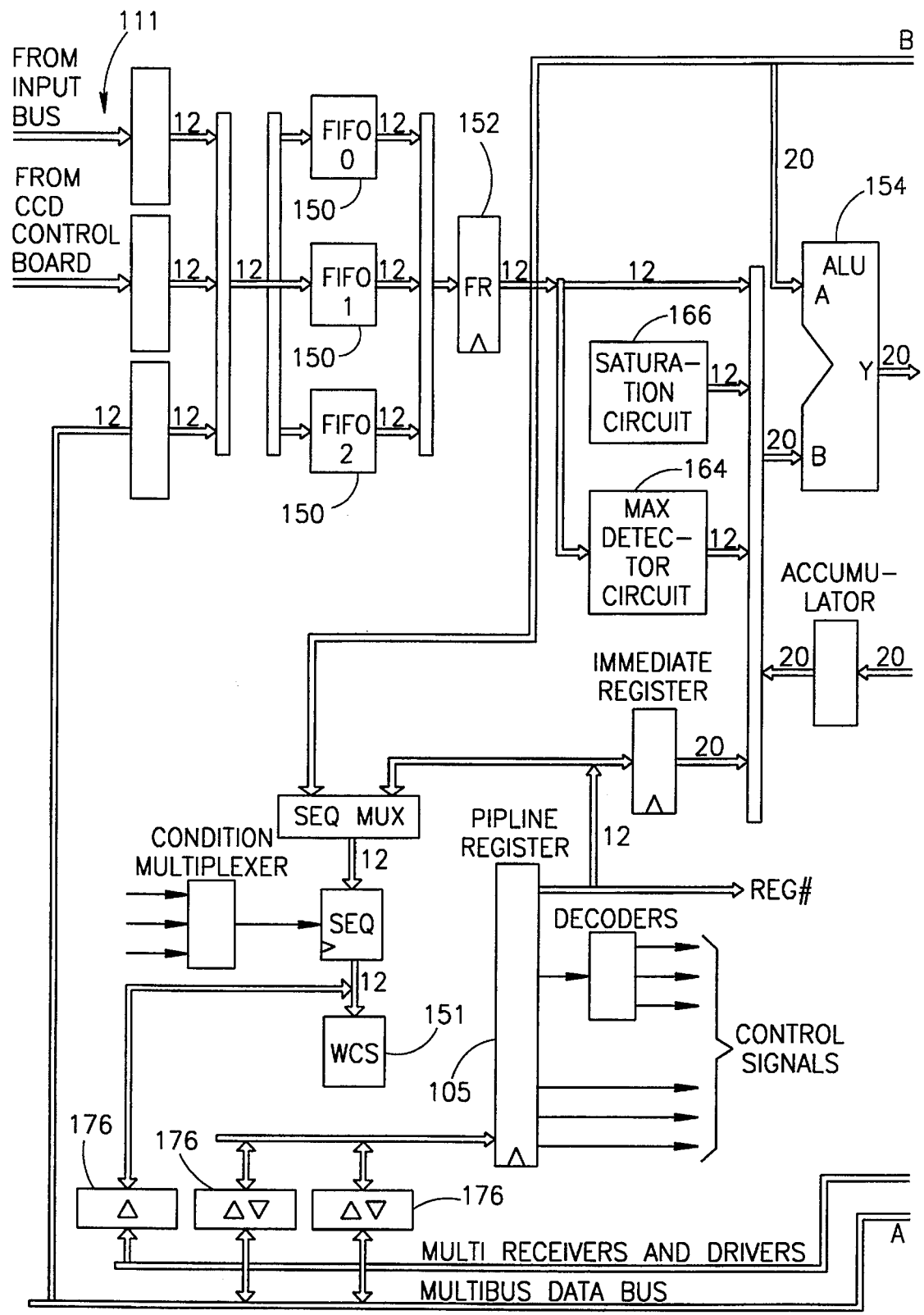
FIG.20A/1

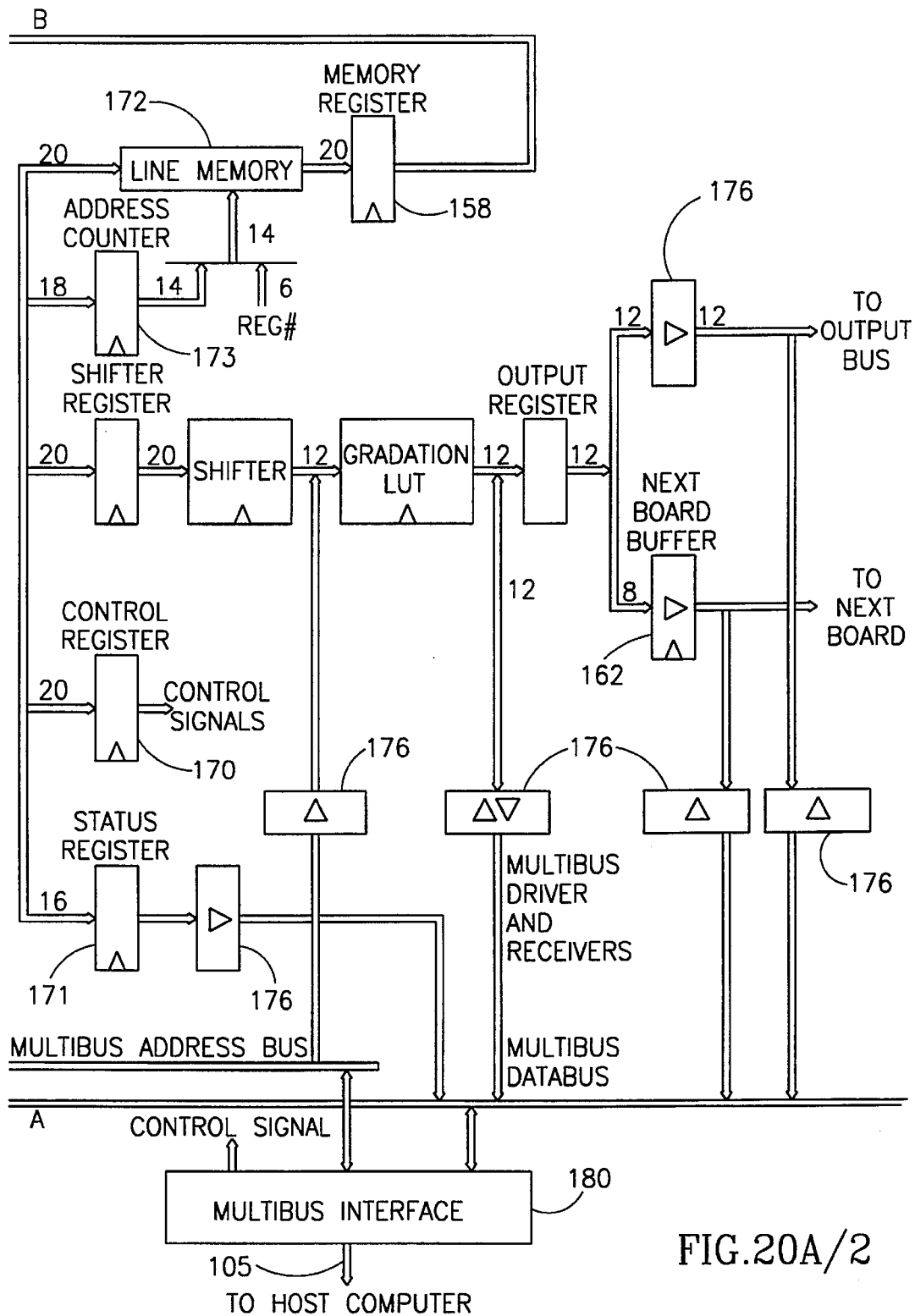
FIG.20A/2

FIG. 4.6 - 3D - LUT

MULTIPLE LENS SEPARATION SCANNER

This is a continuation of copending application Ser. No. 08/652,545 filed on Feb. 8, 1991, which is a CIP of application Ser. No. 07/670,950 filed on Mar. 18, 1991 and now U.S. Pat. No. 5,325,217, which is a continuation of application Ser. No. 07/044,428 filed Apr. 30, 1987 and now abandoned.

FIELD OF THE INVENTION

The present invention relates to color separation scanners generally.

BACKGROUND OF THE INVENTION

Color separation scanners are well known and are operative to scan two dimensional color images, such as prints or transparencies, and to produce electrical signals which represent color separations thereof for subsequent use in process color printing.

Conventional scanners, such as those manufactured and sold by Hell of Germany and Dainippon Screen Seizo of Japan, typically employ a rotating drum onto which the two dimensional color image is mounted. The drum rotates past a scanning head, which may comprise a CCD array, as taught in U.S. Pat. No. 4,256,969. According to that patent, a separate scan is carried out for each separation.

Various techniques are presently known for color separation in array detector based systems. One technique employs three primary Red, Green, and Blue filters installed over the scanning head of a single CCD linear or area array. A color image can be constructed by repeatedly scanning the image, each time with a different filter.

A second technique employs three colored fluorescent lamps. The image is repeatedly scanned, each time under the illumination of a different lamp.

A third technique employs three sensors and dichroic mirrors or filters for separating the three elements of color, each of which is detected by a separate sensor. In its current state of the art, this third technique has not achieved images of a high enough quality to fulfill the requirements of pre-press processing.

Another technique employs a single CCD chip including three linear arrays, each having deposited thereon a different color filter. Lines are read in three colors and combined using electronic hardware. A delay of several lines is interposed between the lines read in the different colors.

There is described and claimed in applicants'/assignee's copending U.S. Pat. No. 5,325,217, a scanner which comprises a movable support arranged for mounting thereon of a two-dimensional image to be scanned and color separation sensing apparatus arranged for sensing the two-dimensional image for providing electrical signals representing color separations of the two-dimensional image, the color separation sensing apparatus including a scanning head including a plurality of CCD arrays, each associated with a corresponding dichroic filter, operative for simultaneous scanning of the two-dimensional image.

That scanner comprises a movable support arranged for mounting thereon of a two-dimensional image to be scanned and having first and second ranges of operative orientations, television sensing apparatus arranged for sensing the two-dimensional image when the movable support is in a first range of operative orientations for providing a visible display of the two-dimensional image to an operator and color separation sensing apparatus arranged for sensing the two-dimensional image when the movable support is in a second range of operative orientations for providing electrical signals representing color separations of the two-dimensional image.

The scanner includes focusing apparatus arranged such that the color separation sensing apparatus and the television sensing apparatus are mounted on a common member, whereby focusing of the television sensed image automatically provides focusing of the color separation sensed image.

SUMMARY OF THE INVENTION

The present invention seeks to provide an improved color separation scanner of the type described and claimed in U.S. Pat. No. 5,325,217 corresponding to Israel Patent Application 78675.

There is thus provided in accordance with a preferred embodiment of the present invention a color separation scanner comprising a support arranged for mounting thereon of a two-dimensional image to be scanned and color separation sensing apparatus arranged for sensing the two-dimensional image. The color separation apparatus includes a scanning head located a fixed distance from the two-dimensional image, at least first and second objective lens assemblies and apparatus for selectively arranging each of the at least first and second objective lens assemblies in fixed locations along the optical path between the image and the scanning head.

Furthermore, there is provided in accordance with a preferred embodiment of the present invention, a color separation scanner comprising a support arranged for mounting thereon of a two-dimensional image to be scanned and color separation sensing apparatus arranged fop sensing the two-dimensional image to generally simultaneously provide electrical signals representing color separations of the two-dimensional image. The color separation apparatus includes a scanning head located a fixed distance from the two-dimensional image.

Additionally, in accordance with a preferred embodiment of the present invention, the scanning head includes a plurality of generally parallel CCD arrays, each associated with a corresponding dichroic filter, and each disposed in a different focal plane.

Additionally, in accordance with a preferred embodiment of the present invention, the color separation sensing apparatus comprises a three-channel color linear CCD imager with three integral color filters, each disposed on its associated channel.

Moreover, in accordance with a second embodiment of the present invention, the color separation sensing apparatus also comprises at least first and second objective lens assemblies and apparatus for selectively arranging one of the objective lens assemblies in a nominally fixed location along the optical path between the image and the CCD arrays. The apparatus for selectively arranging includes apparatus for fine tuning the location of the objective lens assemblies near the nominally fixed location.

Further in accordance with an embodiment of the present invention, there is provided a color separation scanner comprising a support arranged for mounting thereon of a two-dimensional image to be scanned and color separation sensing apparatus arranged for sensing the two-dimensional image for providing electrical signals representing a multiplicity of color separation of the two-dimensional image wherein the color separation apparatus defines an optical axis and includes at least first and second objective lens assemblies each having a multiplicity of focal planes corresponding to the multiplicity of color separations wherein for each color separation, an intersection of the corresponding focal plane and the optical axis is substantially identical for all of the at least first and second lens assemblies.

Still further in accordance with an embodiment of the present invention, there is provided a color separation scanner comprising a cassette arranged for mounting thereon of a two-dimensional image to be scanned and color separation sensing apparatus, the cassette comprising first and second transparent plates mounted on respective frames and joining apparatus openable to 90° for fixedly and flexibly joining together the first and second transparent plates. The joining apparatus additionally comprises apparatus for elastically forcing together the first and second transparent plates when the cassette is closed.

Additionally, in accordance with a preferred embodiment of the present invention, the apparatus for elastically forcing together comprises a hinge eccentrically mounted to the frames for forcing the first and second transparent plates firmly against each other when the cassette is closed and a lock for ensuring that the frames stay together when the cassette is closed.

There is provided in accordance with a preferred embodiment of the present invention, a cassette comprising first and second transparent plates mounted on respective frames and joining apparatus openable to 90° for fixedly and flexibly joining together the first and second transparent plates.

Further, in accordance with a preferred embodiment of the present invention, the color separation scanner comprises apparatus for receiving the cassette and for placing the cassette in an operative location on a cassette holder. The cassette holder is rotatable within 360°. Additionally, the cassette holder includes reference surfaces against which one of the transparent plates of the cassette are placed. In this manner, the plates are accurately placed along the optical axis.

Still further, in accordance with a preferred embodiment of the present invention, the color separation scanner comprises apparatus to illuminate a strip of the two-dimensional image. The illumination apparatus comprises fluorescent illumination and a guide to direct the light through the two-dimensional image.

Still further, in accordance with a preferred embodiment of the present invention, the CCD arrays are positioned in an optical head such that each CCD is positioned at the best focal plane for the color separation that it senses and wherein the best focal plane is substantially identical for each of the at least first and second objective lens assemblies.

Further, in accordance with a preferred embodiment of the present invention, the color separation scanner also comprises a light table assembly comprising a lamp, a set of filters, a diffuser and a screen.

Additionally, in accordance with a preferred embodiment of the present invention, the color separation sensing apparatus comprises a single CCD array and a plurality of different filters disposed in selectable optical communication with the CCD array.

Moreover, in accordance with a preferred embodiment of the present invention, the color separation scanner comprises apparatus for scanning the two-dimensional image and includes apparatus to expose a line of the two-dimensional image during motion of the apparatus for scanning wherein the resultant width of the line is the inverse of a desired resolution level.

Further, in accordance with a preferred embodiment of the present invention, the two-dimensional image can be illuminated by a fluorescent lamp placed directly in line with the optical axis. In this manner, no light guide is necessary.

Finally, there is provided in accordance with a preferred embodiment of the present invention, a method of color separation scanning of an input image comprising the steps of prescanning at least a portion of the input image at least one time for providing output indications of at least brightness of the input image and scanning the input image in accordance with at least the brightness determined in the prescanning step to provide a full-resolution output indication of color separations of said input picture, the scanning step including the steps of moving a carriage on which the input image is placed a predefined distance while a line of the input image is exposed whereby the predefined distance defines a line width which is the inverse of a predetermined resolution level and holding the input image still until electronic processing finishes.

BRIEF DESCRIPTION OF THE DRAWINGS

The present invention will be understood and appreciated mope fully from the following detailed description taken in conjunction with the drawings in which:

FIGS. 4A and 4B are respectively plan and side views of a cartridge useful in the apparatus of FIG. 1;

FIG. 19 is a detailed block diagram of the CCD control card employed in the apparatus of claim 17;

FIGS. 20A, 20B, 20C, 20D, 20E and 20F are together a detailed block diagram of the input card and the interpolation card employed in the apparatus of FIG. 17;

DETAILED DESCRIPTION OF A PREFERRED EMBODIMENT

Figure 1A:
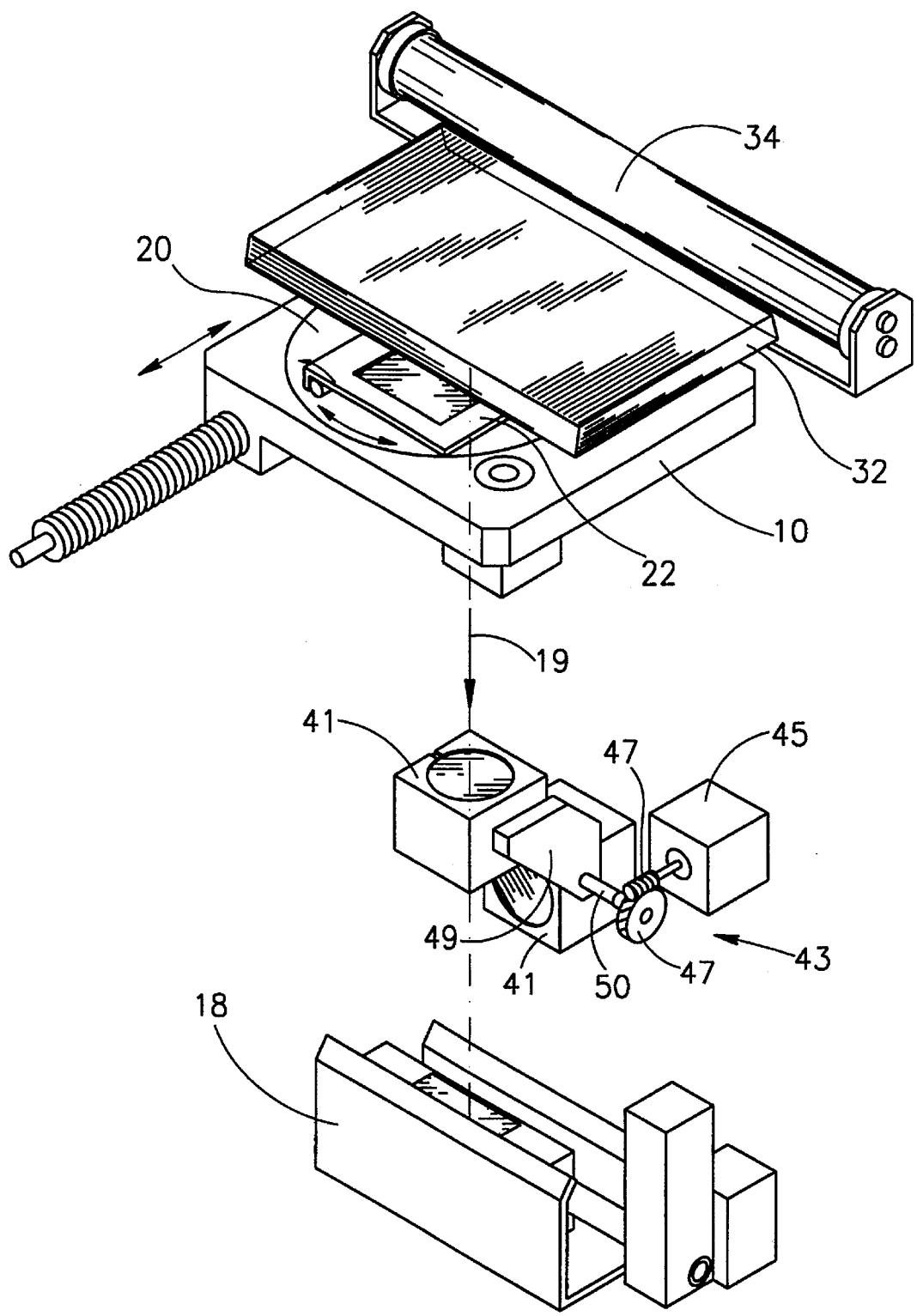
FIG. 1A is a pictorial illustration of elements of the color separation scanner constructed and operative according to a preferred embodiment of the present invention.

Reference is made to FIG. 1A which illustrates a color separation scanner constructed and operative in accordance with a preferred embodiment of the present invention. The scanner comprises a frame, not shown for the sake of clarity, onto which are mounted the elements illustrated in FIG. 1A.

A movable cassette carriage 10, of conventional construction, is provided for support and desired positioning of a two-dimensional input image to be scanned. A CCD array scanning head 18, arranged in a fixed location along an optical axis 19, is provided for scanning one line of the input image.

Carriage 10 is provided with a rotatable cassette holder 20, which is preferably arranged for 360° Potation in the plane of the two-dimensional input image and is driven in such rotation typically by an electric motor (not shown). Removably mounted on cassette holder 20 is a selected cassette 22, typically of the type shown in FIGS. 4A and 4B.

A light guide 32 is disposed above carriage 10 for guiding light from a slit aperture fluorescent lamp 34 to an illuminated strip intersecting optical axis 19, for scanning of transparencies. Carriage 10 is operative, in addition to selecting the desired rotation angle of the cassette 22, for scanning motion.

Figure 1B:
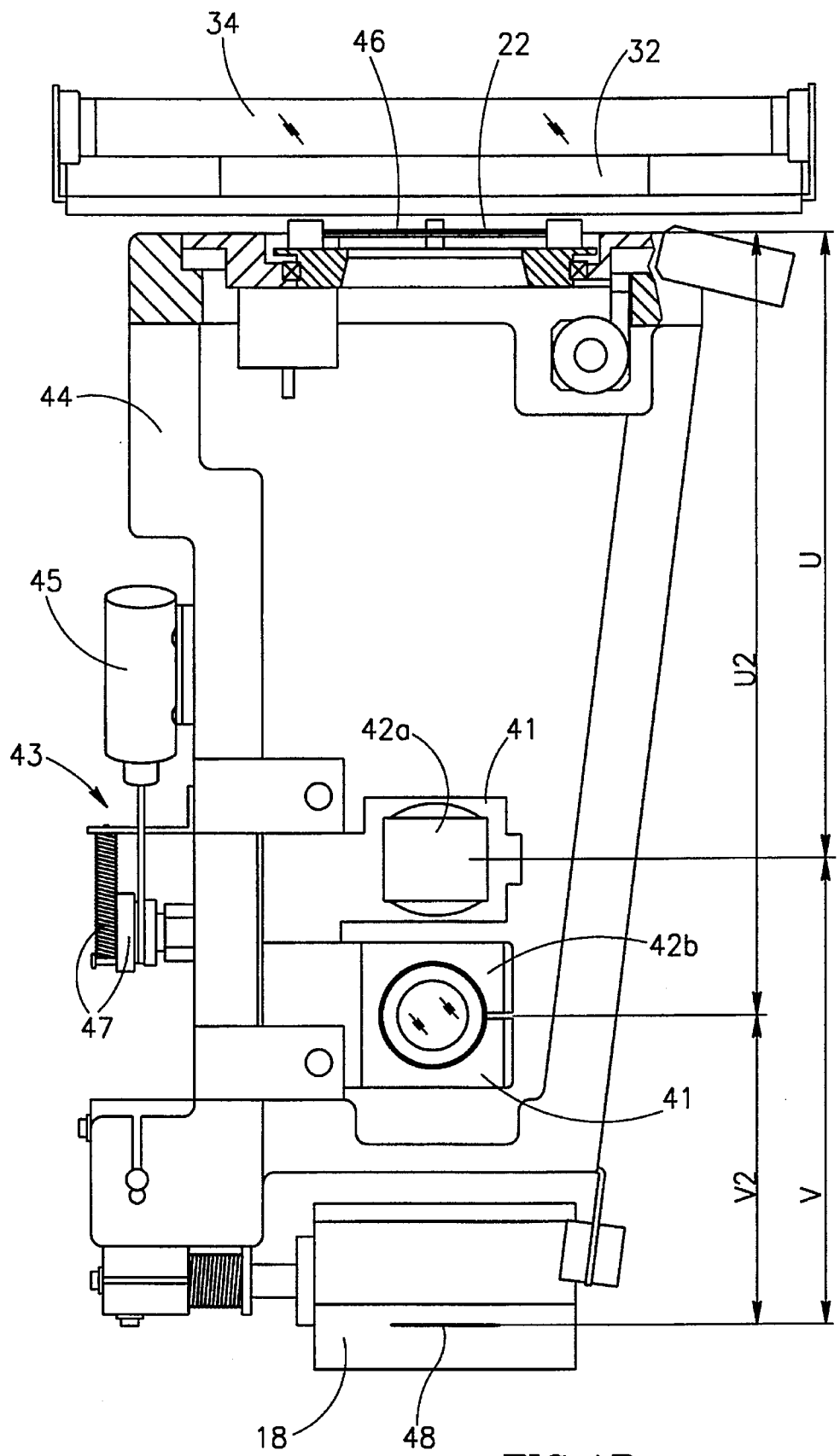
FIG. 1B is a schematic side view illustration of the apparatus of FIG. 1A.
Figure 1C:
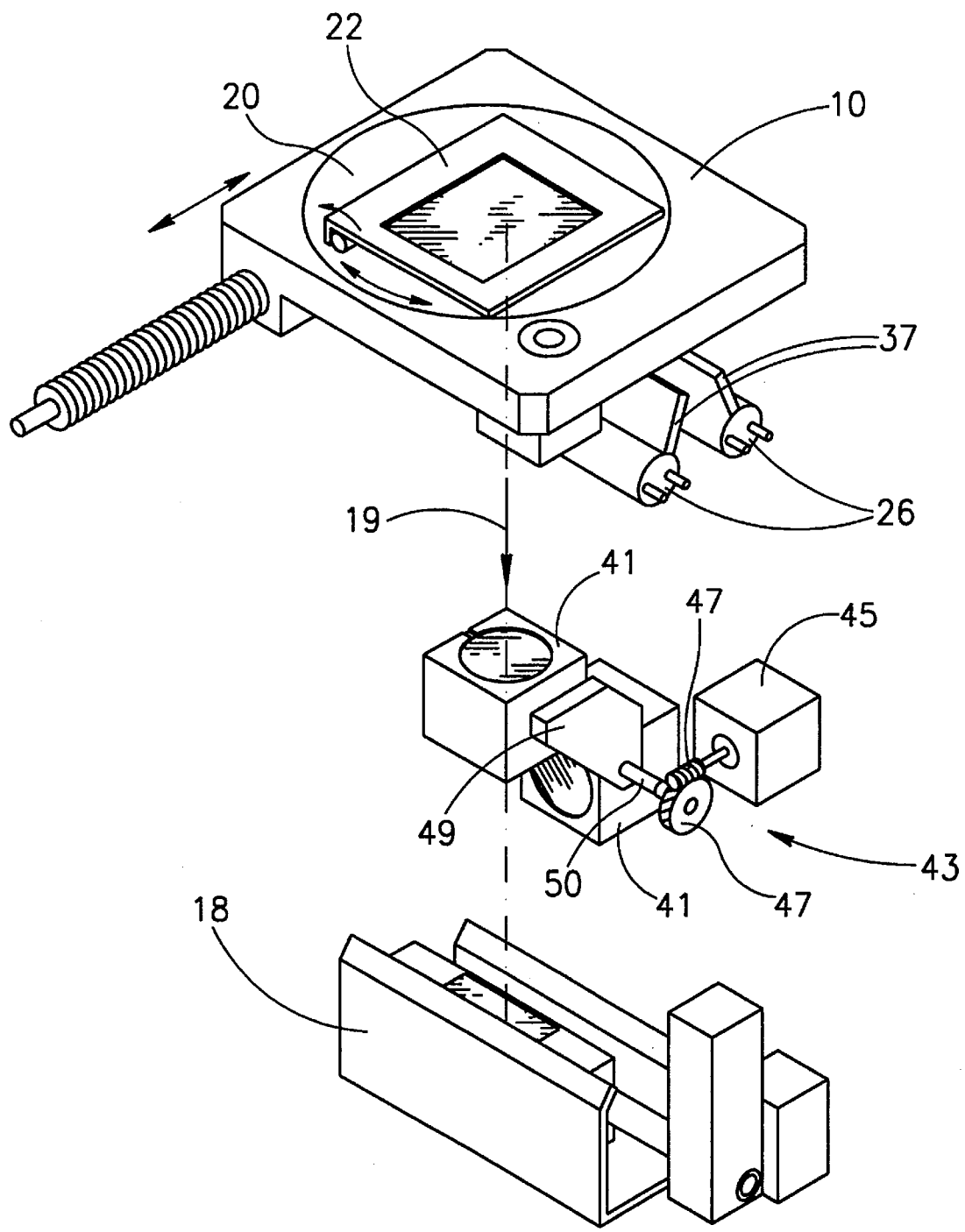
FIG. 1C is a pictorial illustration of an embodiment of the apparatus of FIG. 1 fop use in scanning reflectives.

In accordance with an alternative embodiment of the present invention, as shown in FIG. 1C, opaque two-dimensional input images, hereinafter termed "reflectives", can be scanned. For this purpose, a peripheral array of fluorescent lamps 26 and associated light guides 37 are located below carriage 10 for illuminating reflectives.

Figure 1D:
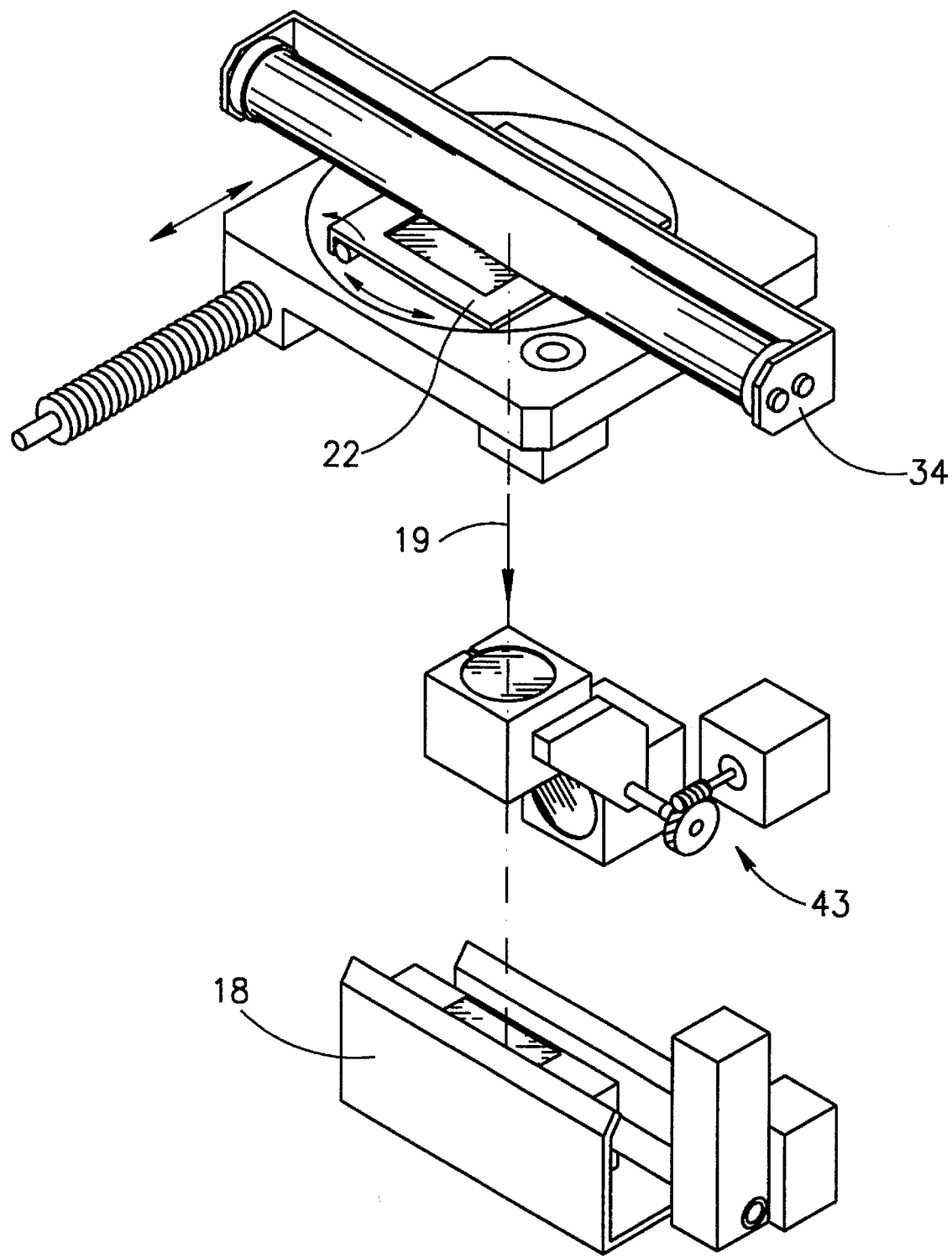
FIG. 1D is a pictorial illustration of an embodiment of FIG. 1A fop use with a fluorescent lamp located directly on the optical axis.

According to a second alternative embodiment of the invention, illustrated in FIG. 1D, fluorescent lamp 34 is placed directly above cassette 22 and intersecting the optical axis 19. In this manner, a strip of the two-dimensional image is illuminated.

Figure 12:
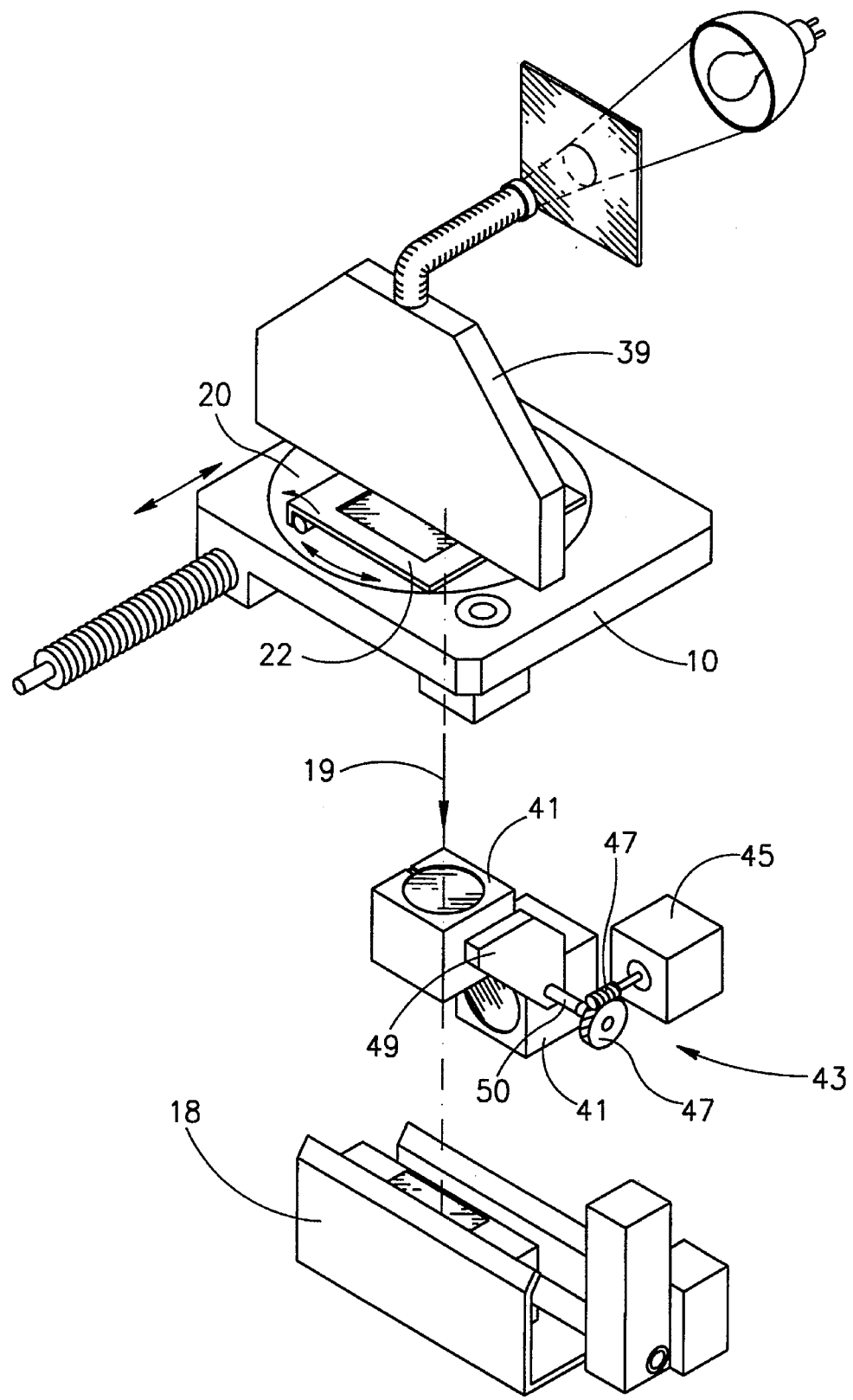
FIG. 12 is an illustration of an alternative embodiment of the apparatus of FIG. 1B, employing fiber optics light guides.

Reference is now made briefly to FIG. 12 which illustrates a third alternative embodient of the present invention which is generally similar to the embodiment of FIG. 1A except that light guide 32 is replaced by a fiber optic light guide 39.

Figure 9A:
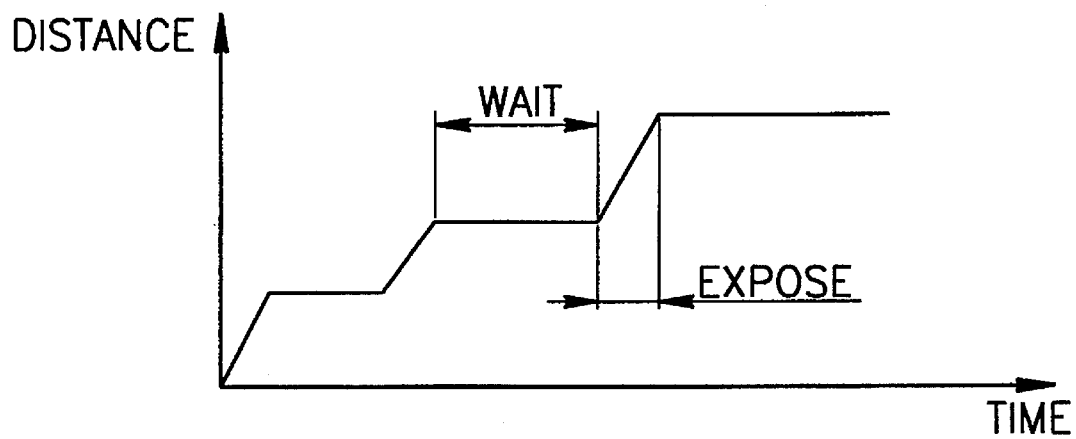
FIGS. 9A and 9B are graphs indicating two alternative types of movement of the image during scanning.
Figure 9B:
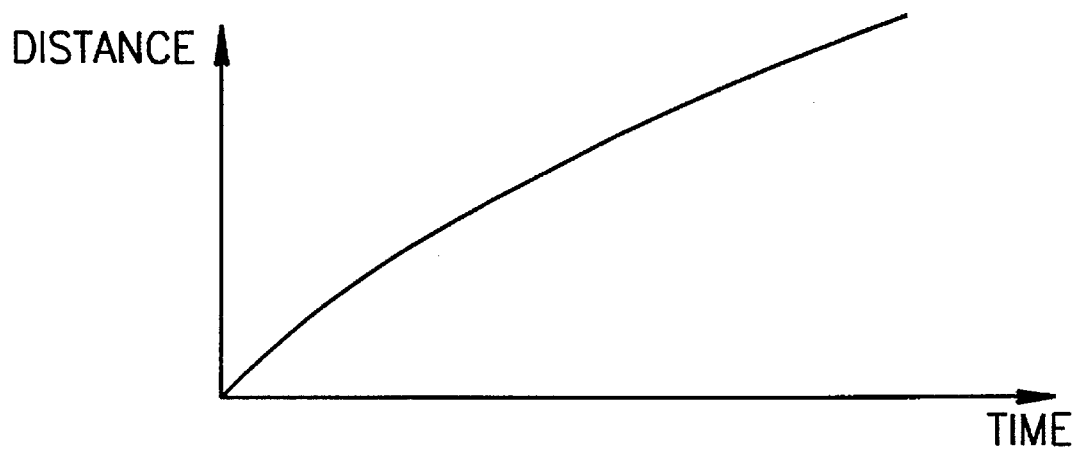

The two-dimensional input image, whether transmissive or reflective is scanned using scanning steps which employ either continuous or step-wise movement of the image. In a step-wise mode of operation, illustrated diagrammatically in FIG. 9A, the carriage carrying the image moves a certain distance while a line is exposed, and then stops until the electronic processing of that line is terminated, moves while exposing a new line and then stops again. This movement causes an area of the image to be optically averaged where the amount of averaging determines the scanning resolution and depends on the width of the exposed line. This technique allows the scanner to provide variable resolutions with an fixed optical setting. In a continuous mode of operation, illustrated diagrammatically in FIG. 9B, exposures are made while the carriage is moving continuously.

Figure 10:
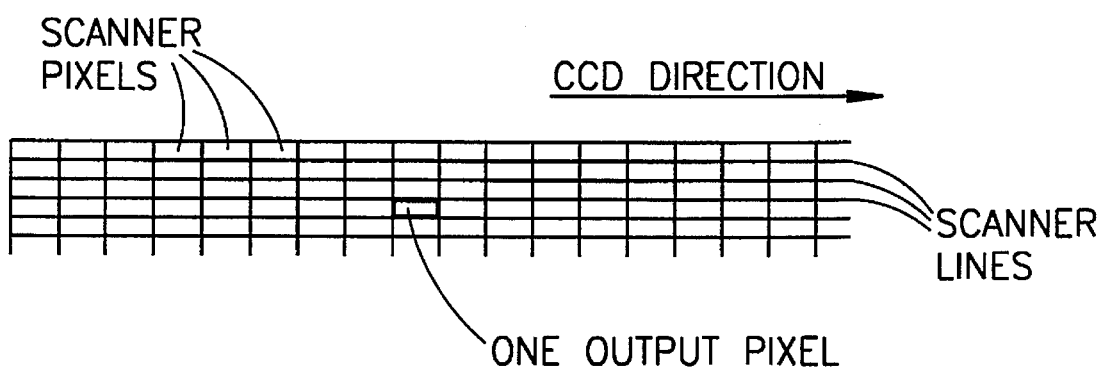
FIG. 10 is a diagram illustrating line averaging according to a preferred embodiment of the invention.

In accordance with a preferred embodiment of the present invention, noise in the image produced by the scanner is reduced by scanning the original with a resolution higher by a certain integer factor k than the required final resolution and averaging k consecutive lines to form one output line. This technique is illustrated diagrammatically in FIG. 10.

Figure 11:
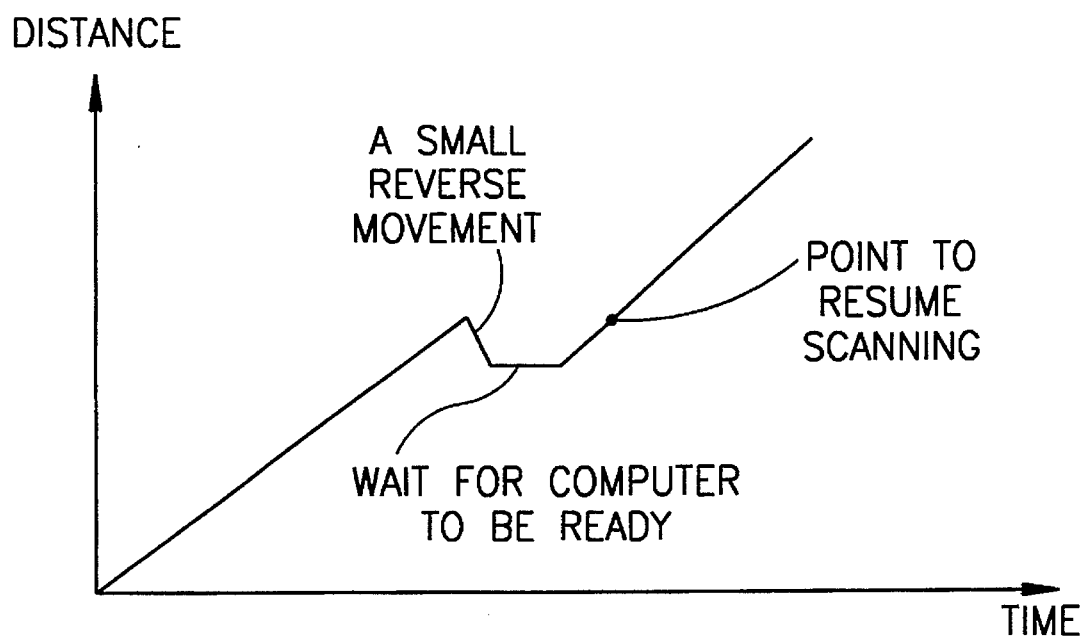
FIG. 11 is a graph illustrating a stop spiral scanning cycle employed in accordance with a preferred embodiment of the present invention.

Additionally in accordance with a preferred embodiment of the present invention, a stop-spiral scanning technique is provided for dealing with situations when the computer system cannot handle the high data rate of the scanner, when the scanner is operating in a continuous scanning mode. The stop-spiral scanning technique, which is illustrated diagrammatically in FIG. 11, comprises the following steps:

stop movement;

move backwards;

wait for the computer to be ready to receive data;

begin forward acceleration;

resume scanning when the stop location is reached.

Color separation scanning is carried out by causing the input image to be line scanned at optical axis 19 by scanning head 18 via a selected one of magnification lenses 42 (see FIG. 1B) each stored in a lens housing 41. Selecting apparatus 43 moves the selected lens housing 41 to its location in an optical path defined by optical axis 19 and removes any other lens housing 41 from the optical path.

It is a particular feature of the present invention that the scanner may be used for both transparencies and reflectives. It is also a particular feature of the present invention that rotation of the input image to be scanned may be accomplished readily by physically rotating the cassette holder 20.

By virtue of employing input image mounting cassettes and an easily replaceable carriage, the range of input image sizes that can be scanned may extend up to 11×11 inch transparencies and reflectives.

Reference is now made to FIG. 1B which illustrates a cross-sectional view of the scanner of the present invention as it is connected together in a frame 44. Frame 44 is provided for maintaining a fixed distance between cartridge 22, holding a transparency 46, and an image detector 48 enclosed in scanning head 18. Lamp 34 illuminates transparency 46 with white light, via light guide 32, and the resultant colored signal is received by an active one of lenses 42, denoted 42a in FIG. 1B and located a distance U from transparency 44. Active lens 42a images the colored signal from the transparency onto detector 48, a distance V from lens 42a.

It will be appreciated that the focal length f of lens 42a is defined by the following equation:

$$1/f = 1/U + 1/V \qquad (1)$$

and subject to the following constraint:

$$U + V = K \qquad (2)$$

where K is a constant, typically equivalent to 45 cm, and U are positive values. Thus, any lens whose focal length f solves equation 1, subject to the constraint of equation 2, can be used in the scanner of the present invention. For example, a second lens 42b is shown in FIG. 1B, located a distance $U_2$ from the transparency 46 and a distance $V_2$ from the detector 48.

It is a feature of the present invention that a multiplicity of levels of magnification are achieved by defining a multiplicity of locations corresponding to the appropriate distances from the transparency 46 and the detector 48 for a multiplicity of lenses. It will be appreciated that this feature minimizes the number of moving parts in the system. The only movement of lenses consists of bringing a newly selected lens 42 to its defined location and of removing a previously selected lens from its defined location. No movement of the scanning head 18 is required during the exchange of the lenses.

In accordance with a preferred embodiment of the present invention, the selecting apparatus 43 (FIG. 1A) comprises a motor 45, gears 47 and a locating bar 49. It will be appreciated that locating bar 49 is designed such that when a lens housing 41 is in the optical path, its corresponding lens 42 is appropriately located.

In accordance with an alternative embodiment of the present invention, selecting apparatus 43 is operative to fine tune the location of each lens 42 about its nominal location. This is useful to overcome slight mechanical changes caused by temperature shifts and ensures that each lens 42 is always located at the optimum location for achieving the best focus.

Figure 2A:
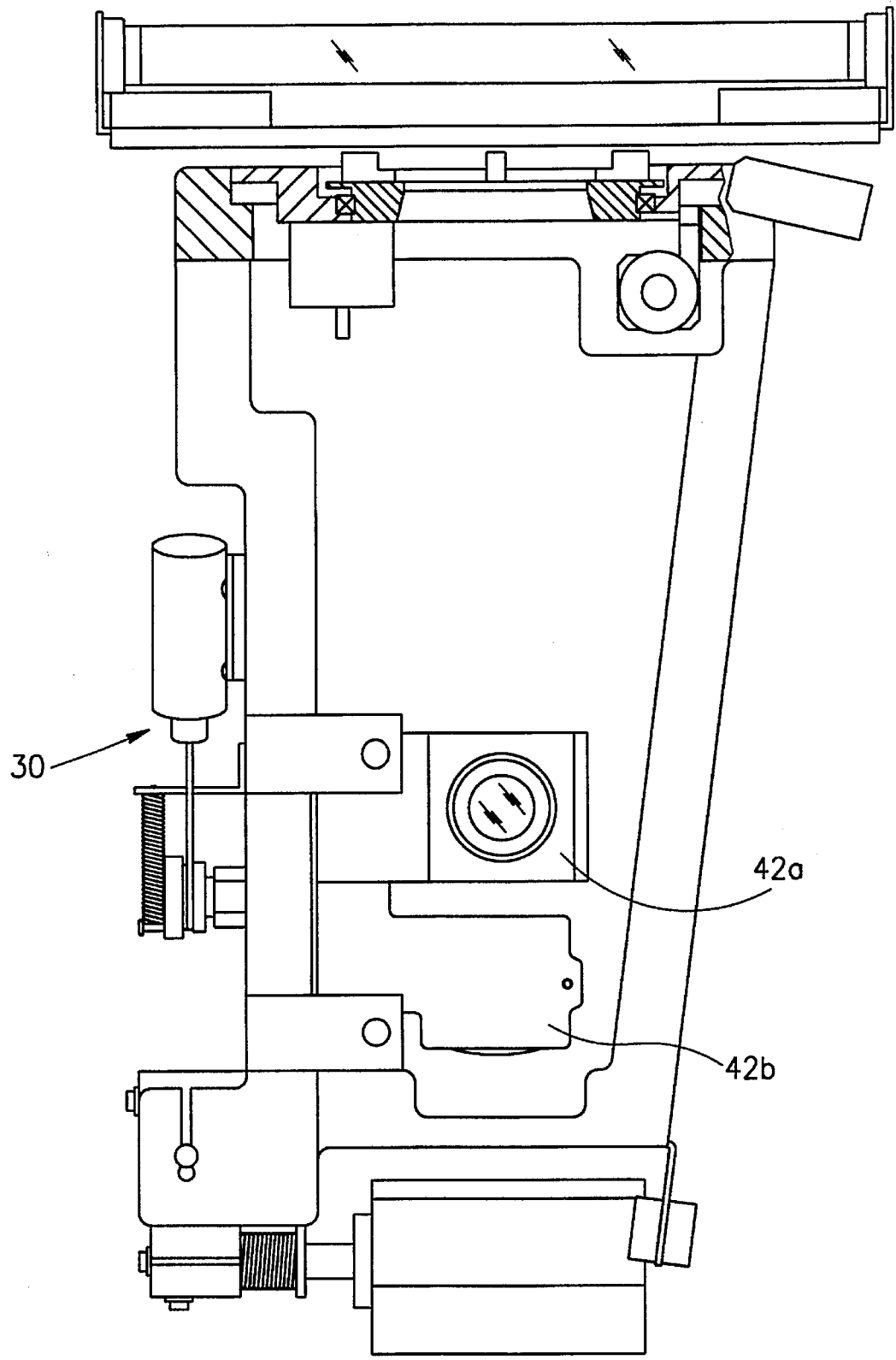
FIGS. 2A and 2B are schematic side view illustrations indicating the operation of a palp of objectives in the apparatus of FIG. 1.
Figure 2B:
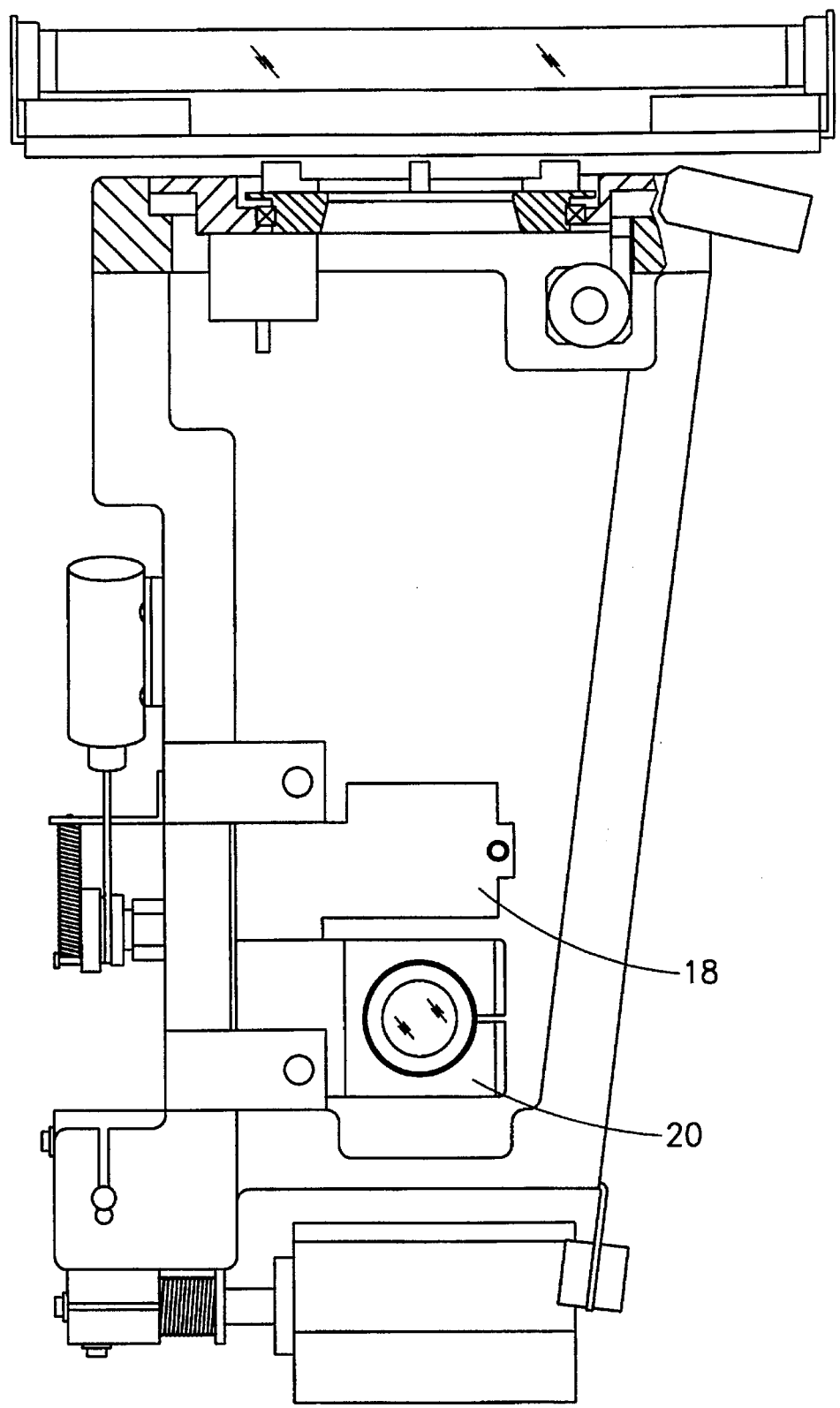

Reference is now made to FIGS. 2A and 2B which illustrate a side view of the scanner of the present invention with lenses 42a and 42b in active and passive locations where the active location is that in which the lens 42 faces the cassette 22. In FIG. 2A, lens 42a is the passive lens and 42b is the active lens. In FIG. 2B, the opposite is true.

Figure 3A:
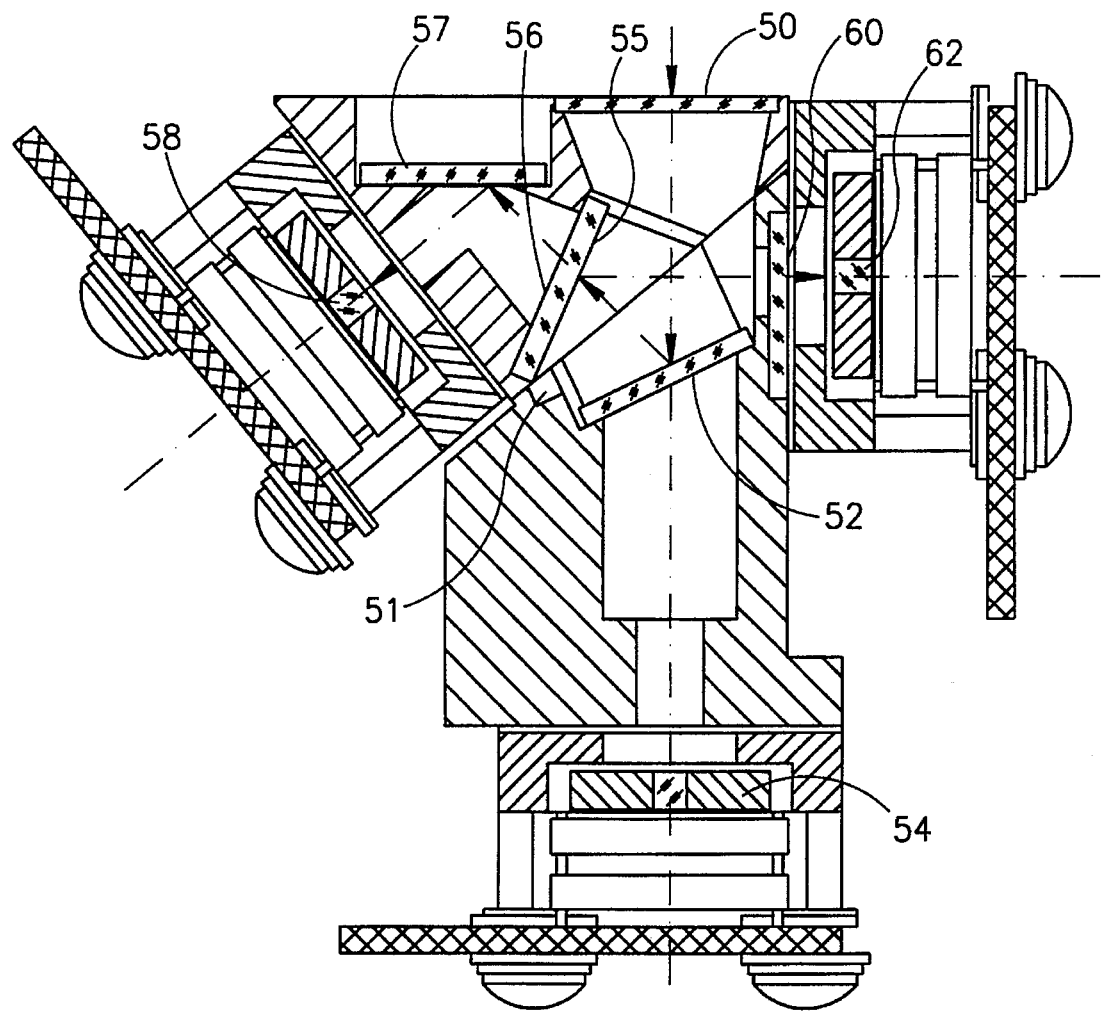
FIG. 3A is a detailed sectional illustration of the scanning head forming part of the apparatus of FIG. 1.

Reference is now made to FIG. 3A which illustrates the scanning head 18 of FIGS. 1A and 1B. Light rays from one of lenses 42 (FIG. 1A) pass through an entrance window 50, which also serves as an infrared radiation removing filter, and impinge upon a first surface 51 of a first dichroic filter 52. Filter 52 passes the blue separation of the spectrum onto a linear CCD array 54.

The yellow separation, combining the green and red separations, is reflected at the first surface 51 to a first surface 55 of a second dichroic filter 56. Filter 56 passes the green separation via a mirror 57 to another linear CCD array 58. The red separation is reflected at the first surface 55 to a third filter 60, which passes it to yet another linear CCD array 62.

The structure of the optical head described hereinabove and illustrated in FIG. 3A has the following particular features:

The angles of incidence upon all of the color separation filters are less than 25 degrees. This feature reduces optical aberrations which would occur to a greater extent at larger angles of incidence such as 45 degrees.

Color separation occurs at the respective first surfaces 51 and 55 of the respective filters 52 and 56. This feature greatly reduces the incidence of ghost images which could result from multiple reflections from the double surfaces of the filters.

The light corresponding to each of the color separations passes through only a 2 mm thickness of glass in a preferred embodiment, wherein the entrance window 50 is of 1 mm thickness and each of the filters 52, 56, and 60 is of 1 mm thickness. The relatively small thickness of glass through which the light passes maintains optical aberrations at a minimum, thereby improving image contrast.

The optical scanning head 18 is characterized by a relatively high numerical aperture (F-number 1.85) in a compact configuration defining an optical distance of 50 mm between the entrance window 50 and the various CCD arrays.

The scanning head does not limit the length of the optical detector employed.

Figure 3B:
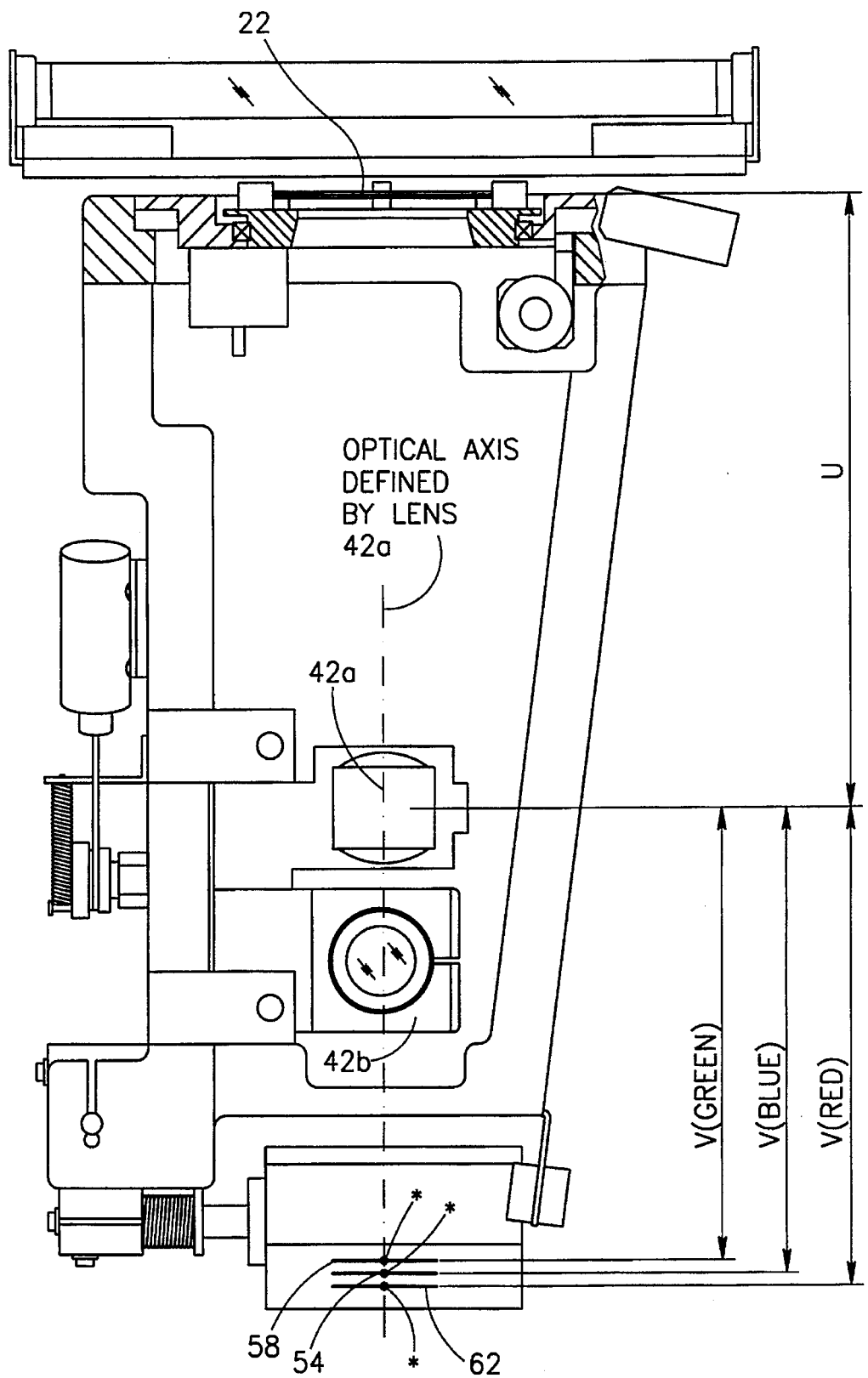
FIG. 3B is a pictorial schematic illustration indicating the locations of three image planes in the apparatus of FIG. 1.

Finally, optical aberrations are reduced by recognizing that the optical aberrations inherent in any lens 42, such as lens 42a, result in differing focal lengths for the red, green and blue color separations. Therefore, in accordance with a preferred embodiment of the present invention, each CCD array 54, 58 and 62 is located at the best focal plane of the lens 42 for the color separation that it senses. This is shown in FIG. 3B which shows three values of V, $V_{green}$, $V_{blue}$ and $V_{red}$. It will be noted that the distance U remains the same.

It will be appreciated that the optical aberration of all lenses 42 used in the scanner of the present invention are required to be substantially equal. By doing so and by arranging the CCD arrays 54, 58 and 62 in a mutually parallel orientation at the focal planes common to the entirety of the lenses 42 for the colors blue, green and red, respectively, substantially equivalent focusing is then achieved for the entirety of lenses 42, regardless of their magnification levels. It will also be appreciated that typically, the focusing for all lenses 42 is the best possible focusing.

Filters 52, 56, and 60 are employed herein according to a preferred embodiment of the invention to "slice" the overall spectral range into a number of parts, all of which are to be used, here Red, Green, and Blue. Ghost images may be produced when light impinges at an angle other than 90 degrees on a filter and is reflected backwards by the second surface of the filter and thereafter reflected forward by the first surface thereof towards a detector, resulting in the creation of a second relatively weak and unfocused image in addition to the first image.

The dichroic filters employed in the invention comprise colored glass having a dichroic multilayer coating on their respective first surfaces and a conventional optical antireflective coating on their respective second surfaces.

The anti-reflective coating tends to minimize the reflection from the second surface and is effective to reduce ghost images. Additionally, in view of the fact that ghost images consist mainly of parasite colors, i.e. the ghost of the blue separation comprises mainly green and red colors, etc., the colored glass is effective to attenuate these parasite colors. In the blue separation, for example, a blue colored glass substrate in filter 52 absorbs the green and red colors and the antireflective coating on the second surface thereof may be optimized to the blue section of the spectrum to eliminate the possibility of a blue color ghost image.

The use of colored glass filters also allows less expensive optical coating techniques to be employed, because the glass filter substrates absorb colors that otherwise would have to be transmitted by the coatings.

It is a particular feature of the present invention that the light guide 32 employed therein, as described hereinabove with reference to FIG. 1A, acts as a light spatial averaging device. At the output side of the light guide, each point represents a contribution of all points along the fluorescent lamp. The light is reflected many times within the light guide to create a new light source, i.e. the light guide output, which has a spatially flat intensity distribution. Therefore, changes in the spatial distribution of the intensity of the fluorescent lamps do not affect the spatial distribution of the intensity of the output of the light guide.

Figure 8:
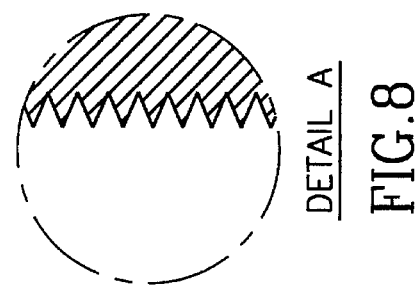
FIG. 8 is a detailed sectional illustration of a portion of the grooved light path of the scanning head of FIG. 28.
Figure 7:
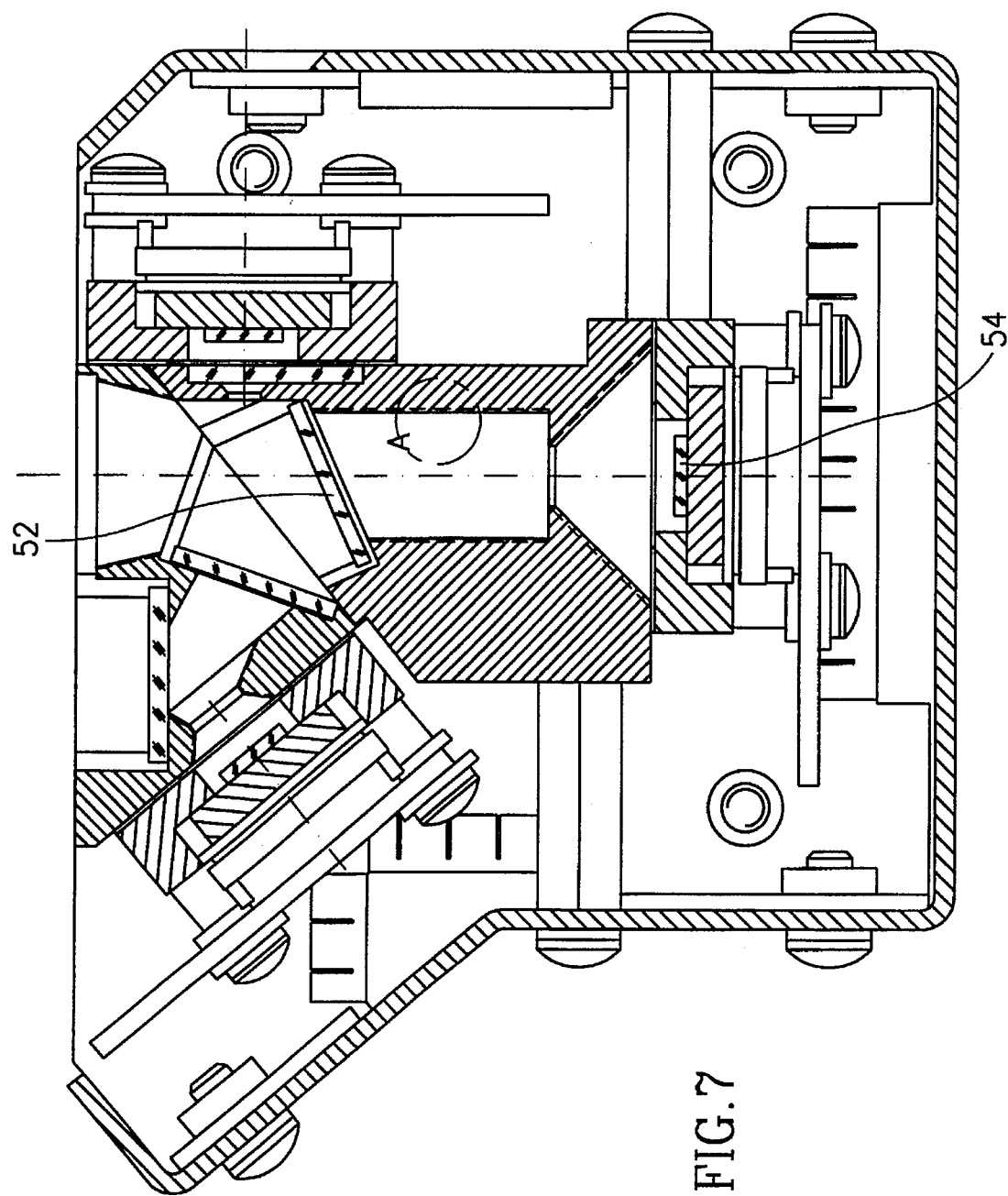
FIG. 7 is a detailed sectional illustration of an alternative scanning head design, similar to that of FIG. 3A but having a grooved light path.

According to a preferred embodiment of the present invention, the inner surfaces of the optical head are configured so as to reduce the effect of light reflection. As seen generally in FIG. 7 and in detail in FIG. 8 the inner surfaces of the optical head, such as the light path between filter 52 and CCD array 54 may be grooved to reduce the effect of reflection of stray light.

Figure 13A:
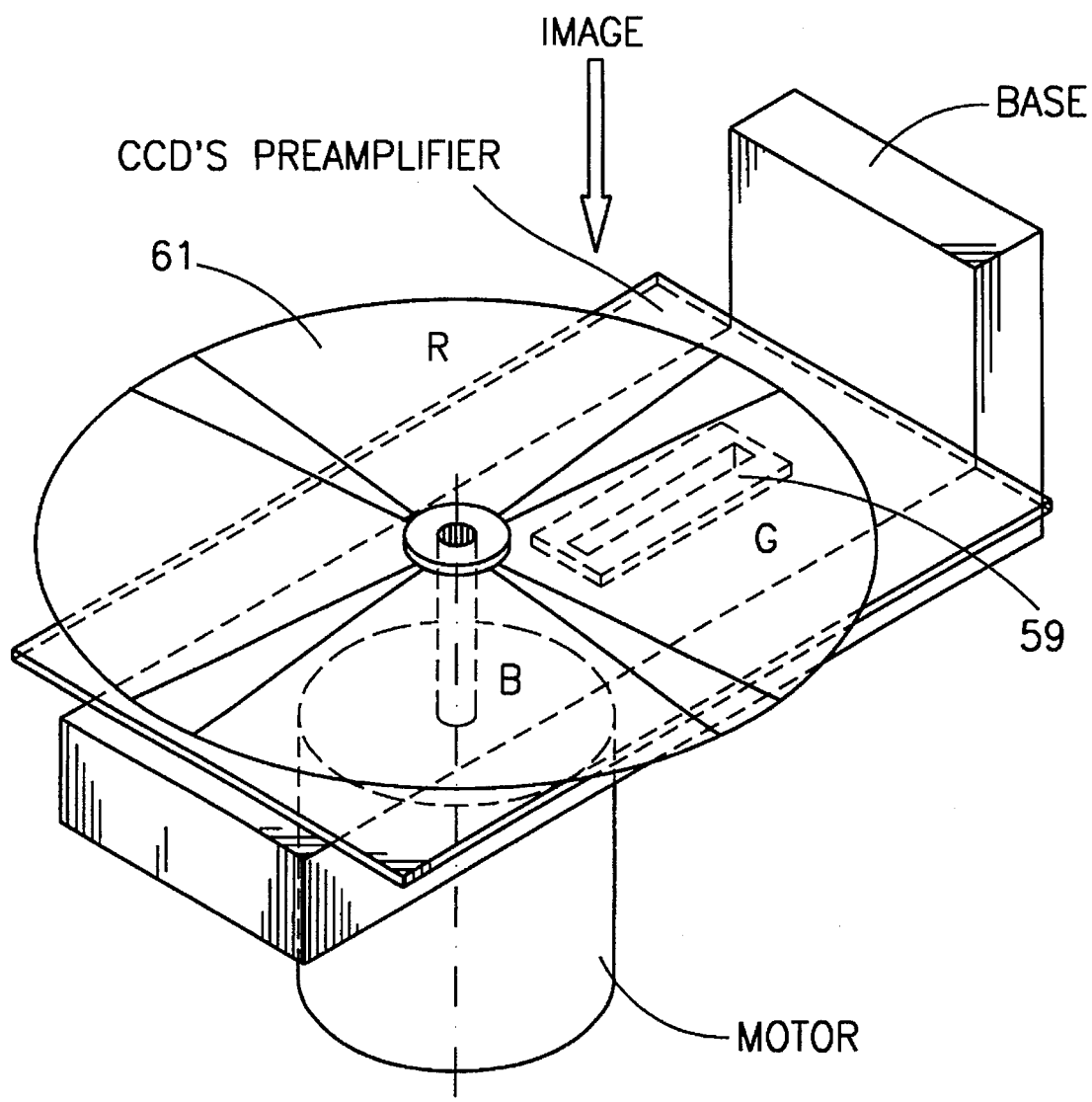
FIGS. 13A and 13B illustrate two alternative color separation configurations employing a rotating color filter wheel.
Figure 13B:
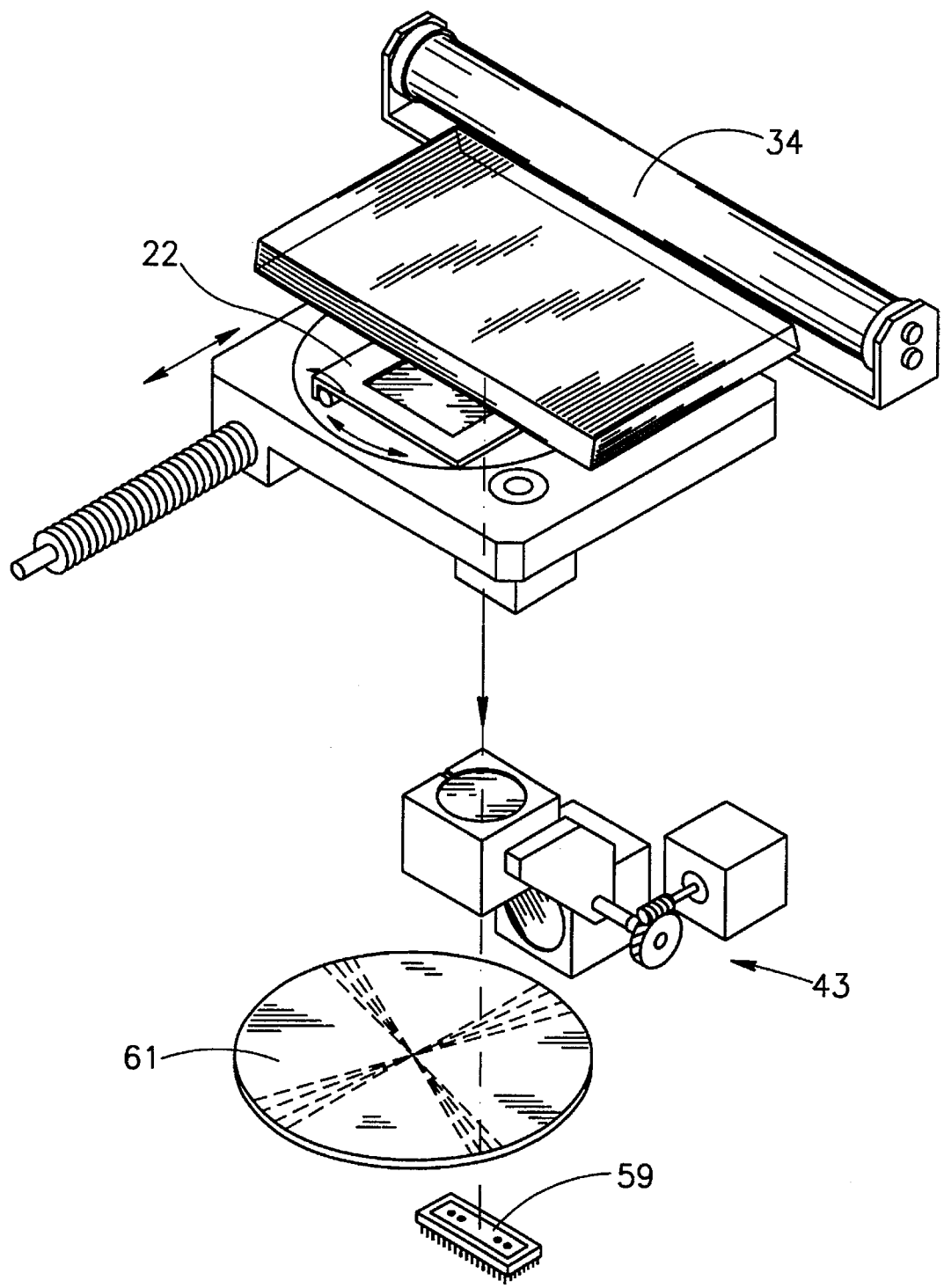

According to an alternative embodiment of the present invention, color separation may be accomplished alternatively by using a single CCD 59 and a rotating color filter wheel 61 disposed adjacent the CCD. Such a configuration is illustrated in FIG. 13A. Rotating color filter wheel 61 is shown incorporated into the scanner of the present invention in FIG. 13B.

Figure 14:
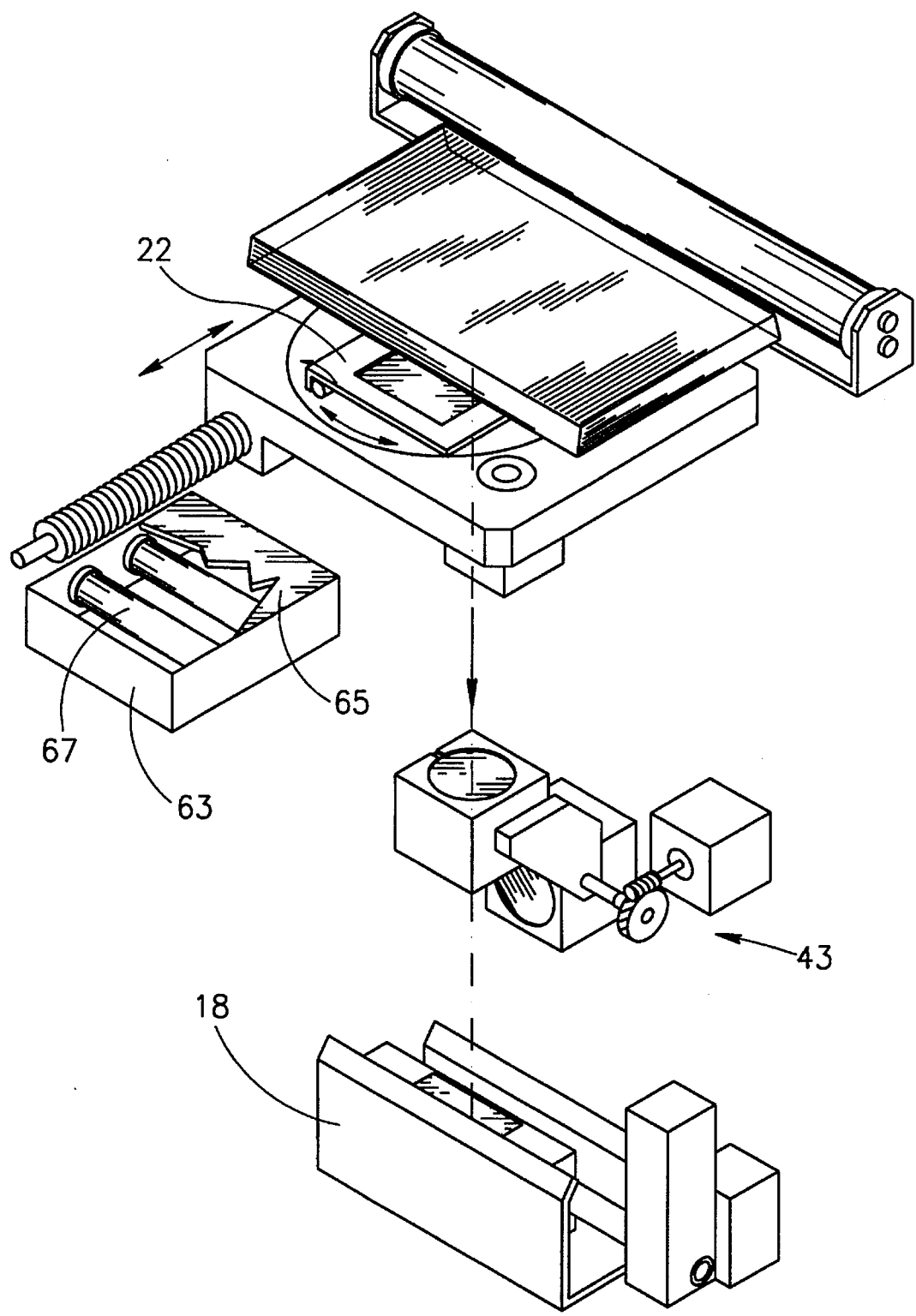
FIG. 14 illustrates a configuration of the present invention employing a light table assembly.

According to a second alternative embodiment of the present invention, shown in FIG. 14, a light table assembly 63 is included to enable the scanned transparency to be viewed between the scanning cycles. The light table assembly 63 comprises a diffuser 65 and lamps 67.

According to a third alternative embodiment of the present invention, color separation can be accomplished via a scanning head comprising a three-channel color linear CCD imager, such as the KLI-50603 manufactured by Kodak. The CCD imager comprises filters which are typically integral color filters.

Reference is now made to FIGS. 4A, 4B, 5A and 5B, which illustrate a cassette 22 (FIG. 1A), which is useful in conjunction with both transparencies and reflectives in accordance with a preferred embodiment of the present invention. The cassette 22 is typically formed of two planar pieces of glass 70 and 72, whose inner surfaces are roughened, as by etching, in such a way as not to diminish image contrast but to eliminate Newton rings which would be created when transparencies are placed against non-etched glass. Alternatively, an antireflective coating can be placed on the glass pieces 70 and 72. The foregoing techniques eliminates the need for refraction index matching oil between the transparencies and the glass plates, as in conventional scanners.

The glass pieces 70 and 72 are framed by frames 71 and 73, respectively, where frame 73 is small enough to fit inside of frame 71 when the cassette 22 is closed. Glass piece 72 is edged by a knife edge 69 useful for maintaining it in its frame 73. Glass piece 70, on the other hand, is held in its frame 71 by the elastic force produced while the glass is inserted between the frame 71 and a stopper 1.

The two frames 71 and 73 are joined by hinges 78, each comprising a hinge pin 79 and a spring leaf 77. The center hinge pin 79 is typically located slightly lower than the surface of glass 70. When frame 73 is rotated into frame 71 and the cassette 22 is closed, the hinge pin 79 and the spring leaf 77 push against each other, thereby putting frames 71 and 73 in tension. Thus, the two glass pieces 70 and 72 are firmly pushed together.

A lock comprising a hook 74 attached to frame 73 and an eye 75 attached to frame 71 is provided to hold the two frames 71 and 73 together against the force due to the eccentricity of hinge pin 79.

Figure 5A:
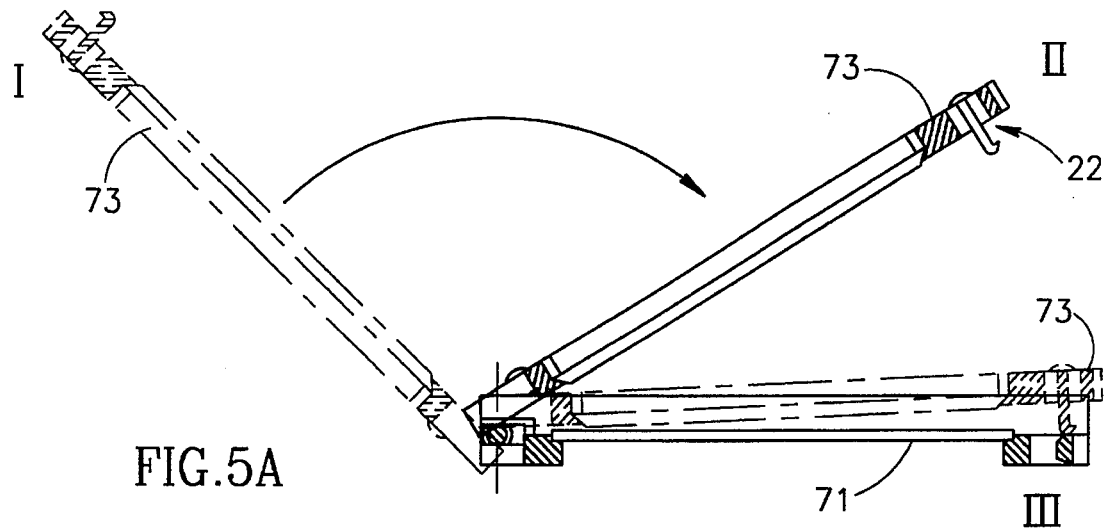
FIGS. 5A and 5B are pictorial illustrations of the closing of the cassette of FIG. 4.

FIG. 5A illustrates the cassette 22 while in the process of closing. Frame 71 remains stationary as frame 73 rotates into it. Three positions of frame 73, marked I, II and III, are shown. Location I is a position early in the rotation, location II is a position intermediate an initial position and a final one, and location III is a position prior to closing the cassette 22. It should be noted that location III of frame 73 is the non-tensioned location of frame 73 on top of frame 71.

Figure 5B:
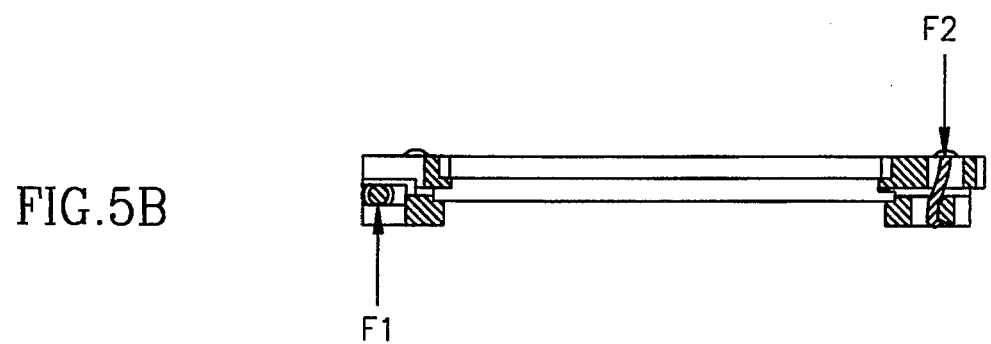

FIG. 5B shows the final position of frame 73 inside frame 71 as well as the locations of two tension forces $F_1$ and $F_2$ on the closed cassette 22 caused by the eccentric location of hinge 79.

An inner opal mask 80, having a typical optical density of 0.6, is provided on glass piece 70 to obscure the area external of the film. The mask ensures that the brightest location will be within the transparency but nevertheless allows parts of the transparency which are covered by the mask to be viewed, so that reference points outside of the image to be scanned can be seen.

An outer opaque black mask 82 is provided around opal mask 80 and is arranged so as to darken the portion of glass piece 70 outside of opal mask 80.

Figure 6:
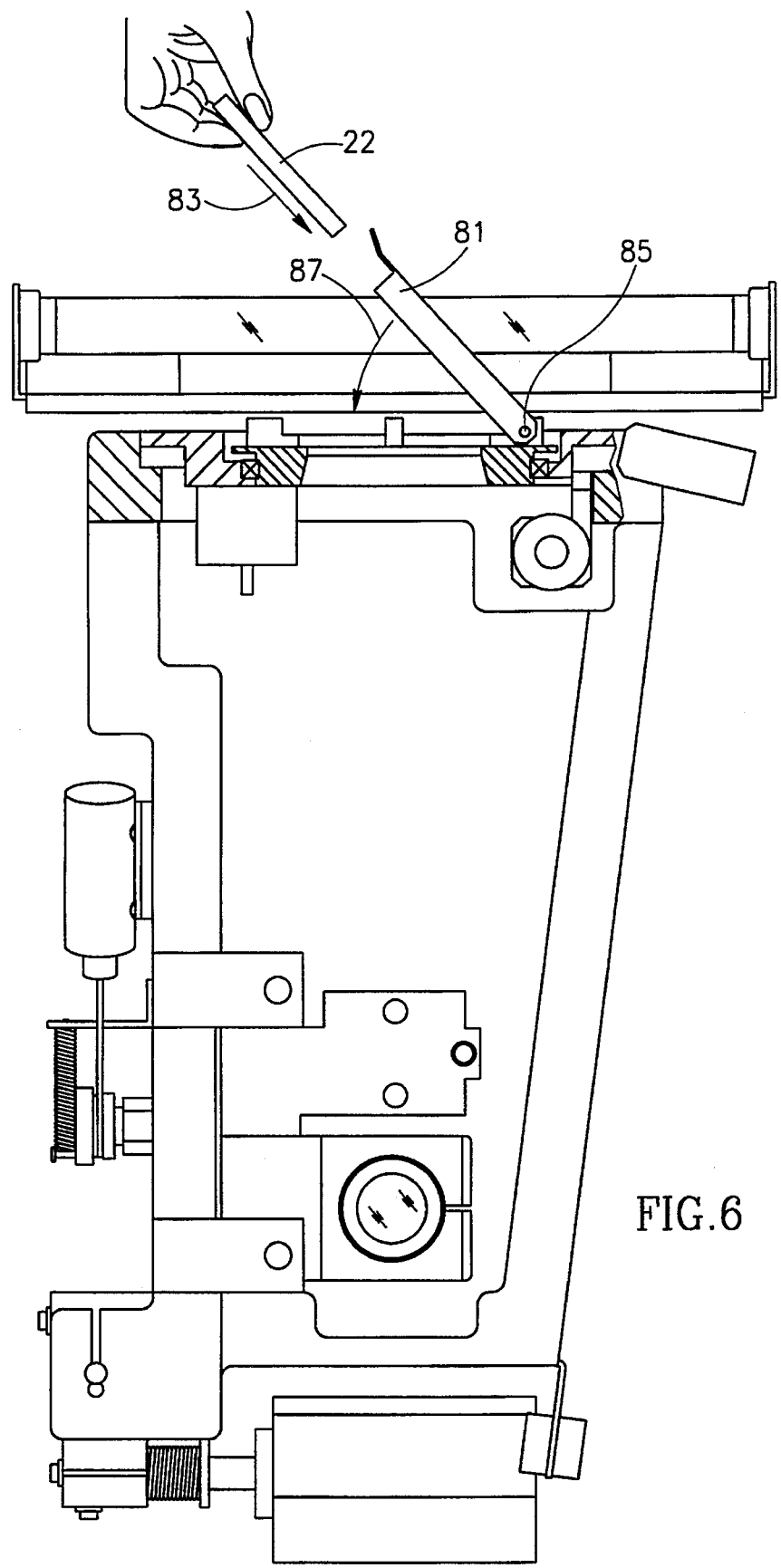
FIG. 6 is a pictorial illustration of insertion into the apparatus of FIG. 1 of a cassette of FIG. 4 holding a document to be scanned.

Reference is now made to FIG. 6 which illustrates the loading of a cassette 22 into the scanner of the present invention. The closed cassette 22 is loaded into an open cassette holder 81 in the direction of arrow 83. The cassette holder 81 is closed, through rotation about a pin 85, in the direction of arrow 87. Flat springs 93 (FIG. 4A) push against the cassette holder 81 and ensure that the cassette 22 remains in a fixed location inside the cassette holder 81. To remove the cassette 22, the cassette 22 is drawn out of cassette holder 81.

Cassette holder 81 inserts cassette 22 into the scanner in a cassette tape manner, whereby the closing of cassette holder 81 locates cassette 22 in its operative location inside of cassette holder 20 (FIG. 1A).

Cassette handles 91 (FIG. 4A), integral to frame 73, are provided for holding the cassette 22 when loading and unloading the cassette 22 from the scanner.

Figure 16:
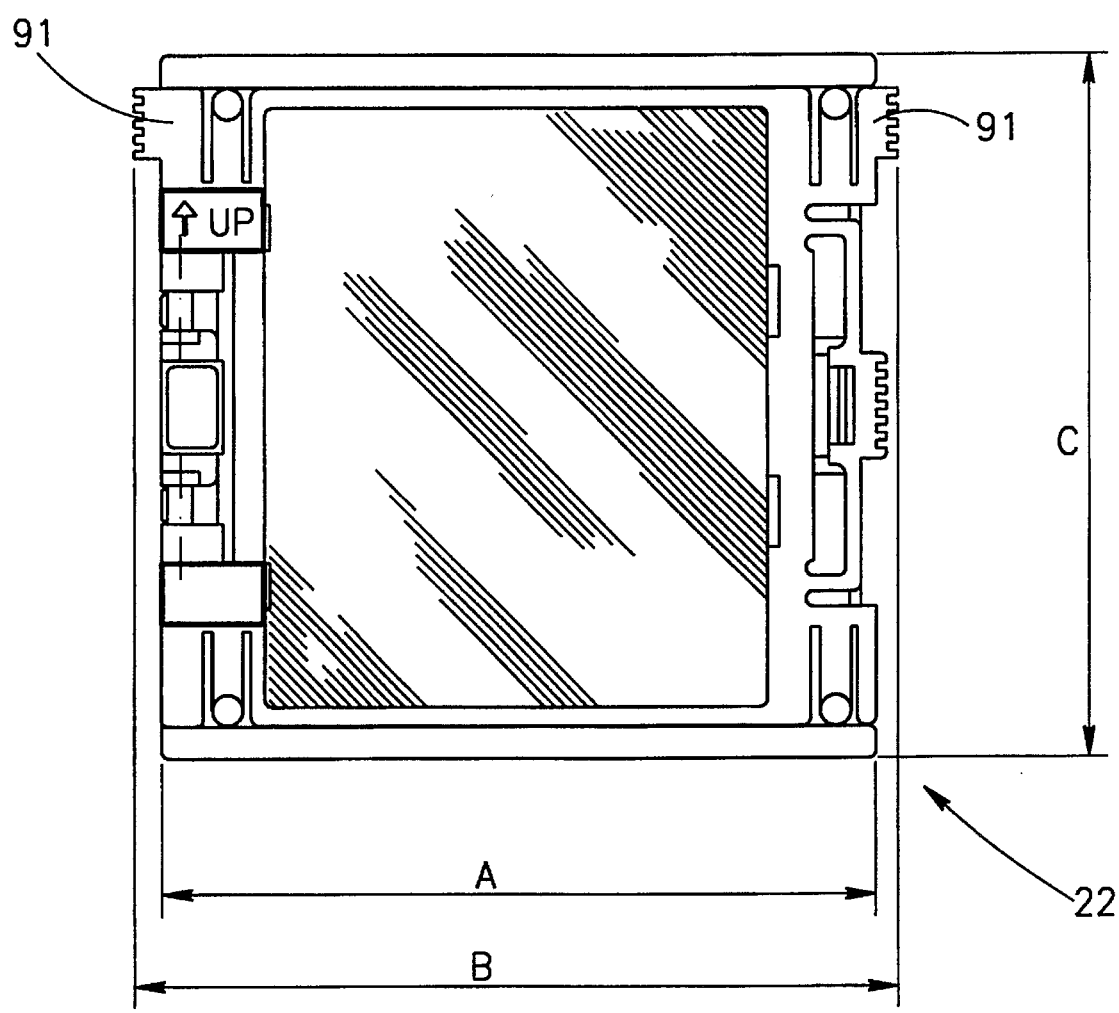
FIG. 16 is a schematic illustration of a cassette with asymmetric dimensions.

It will be appreciated that frames 71 and 73 can have a asymmetric shape so as to fit in cassette holder 81 in one direction only. This is shown in FIG. 16 where the smallest width of cassette 22 is marked A. Since the cassette handles 91 extend from the frames 71 and 73, the full width of the cassette 22 is larger than the width A and is marked as B. The length of the cassette 22 is marked C. The cassette 22 will only fit into a cassette holder 81 which has a width slightly larger than the width A, but smaller than the dimensions marked B and C. In such a cassette holder 81, the cassette 22 can only be inserted in one direction. The cassette handles 91 will not be inside the cassette holder 81 and will therefore, be readily available for removing the cassette 22 from the holder 81.

Figure 15A:
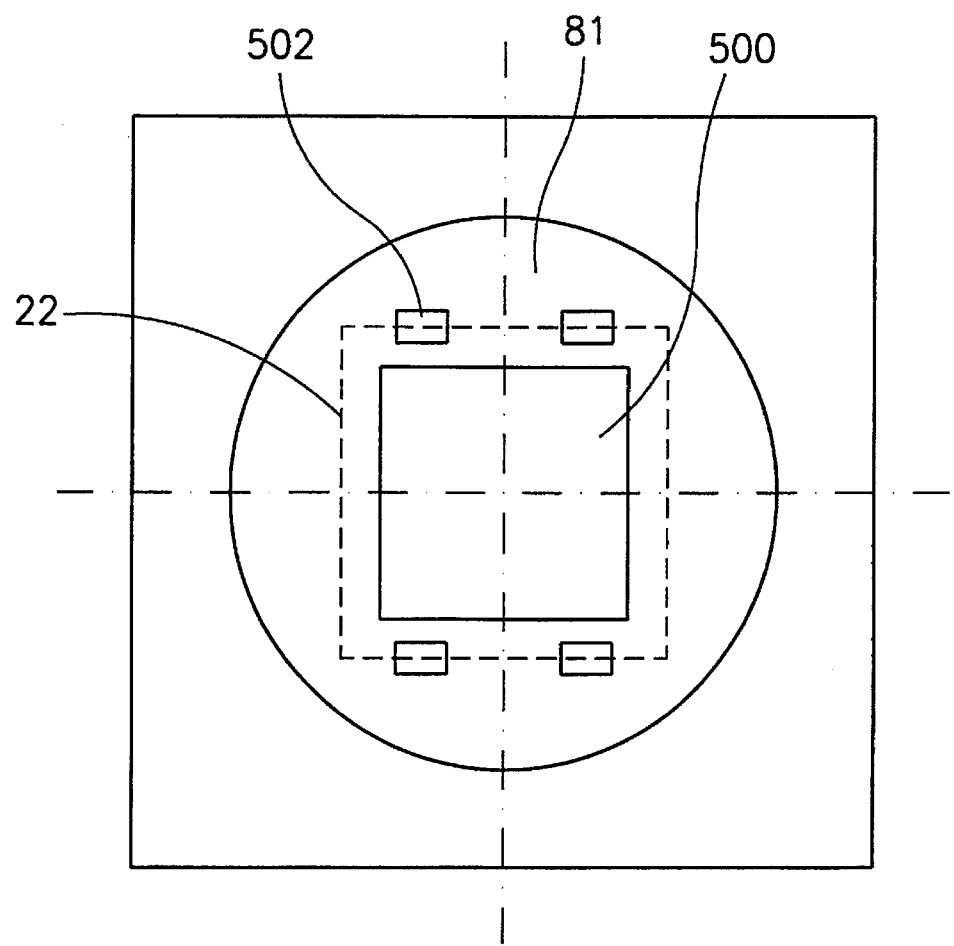
FIGS. 15A and 15B are detailed illustrations of a cassette holder useful in the apparatus of FIG. 6.
Figure 15B:
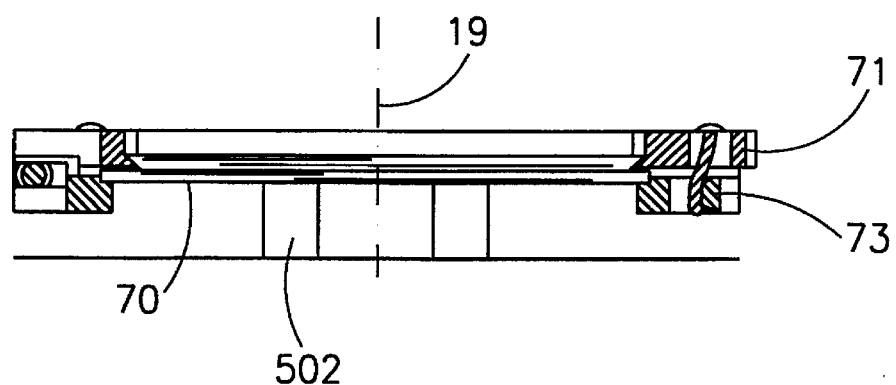

Reference is now made to FIGS. 15A and 15B which detail the cassette holder 81. FIG. 15A is a top view and FIG. 15B is a side view. Cassette holder 81 comprises a rectangular window 500, through which the two-dimensional image will be scanned, and four reference surfaces 502 against which one of glass pieces 70 or 72 of cassette 22 is pressed. The reference surfaces 502 jut out from the surface of cassette holder 81, in the direction of the optical axis 19, and are accurately machined so that the glass piece 70 or 72 is perpendicular to the optical axis when placed on the reference surfaces 502. In this manner, any inaccuracies in the formation of the frames 73 and 71 do not affect the alignment of the two-dimensional image along the optical axis 19.

The scanning technique will now be described briefly. When a new image is sought to be scanned, it is first subject to a prescan carried out using the CCD array scanning head 18.

The operative parameters of the prescan, such as reflective or transmissive scanning, and nominal input size are initially set by the operator through host computer 103. Alternatively, a bar code, containing the operative parameters of the prescan and placed at the side of the cassette, can be read.

The dynamic range of the CCD is determined by exposure control of the CCDs. This is achieved by governing the integration time and the intensity of the light illuminating the CCDs. In practice, the analog amplification is calibrated so that the saturation of the CCDs occurs at a given voltage which is transformed to digital information and read by the computer. This reading enables the computer to decide how to set the exposure time and the light level.

The scanning sequence is generally as follows:

A first prescan is initiated by placing a loaded cassette 22 in the cassette handle 81, as shown in FIG. 6. Upon closure of cassette handle 81, the cassette 22 is located in the appropriate position on cassette holder 20. The scanner is then set to prescan the input image. Prior to this prescan, however, the CCD arrays are exposed to the light source output of the light guides and the light level and the integration times of the CCD arrays are adjusted for full dynamic range. The light source is then masked to provide calibration of the darkness with the same integration time to produce dark correction information. Thereafter, an intermediate light density is provided for calibration of responsivity of individual CCD cells.

Prescan is then performed, as are responsivity and dark signal calibrations, and the image is displayed on a monitor to the operator. The brightness of point detected during the prescan is displayed with maximum monitor brightness.

The image of the image seen on the screen after a prescan is in low resolution so that it is impossible to judge its sharpness. Using a cursor operated by a mouse, a point on the screen can then be selected around which a second prescan can be carried out so that the image will now appear with full resolution and its sharpness can be evaluated.

The prescan image is used by the operator to enter his requests, such as crop lines, rotation angle, and color and sharpening parameters.

A new integration time is then calculated taking into account the brightest image level measured previously in order to stretch this level to the maximum dynamic range of the detector. Dark signal calibrations are then carried out again on the basis of the new integration time. After this, a final high resolution scan occurs.

The electronic circuitry for operating the color separation scanner of the present invention is disclosed in U.S. Patent Application 07/044,428, corresponding to Israel Patent Application 78675, and is described hereafter.

Figure 17:
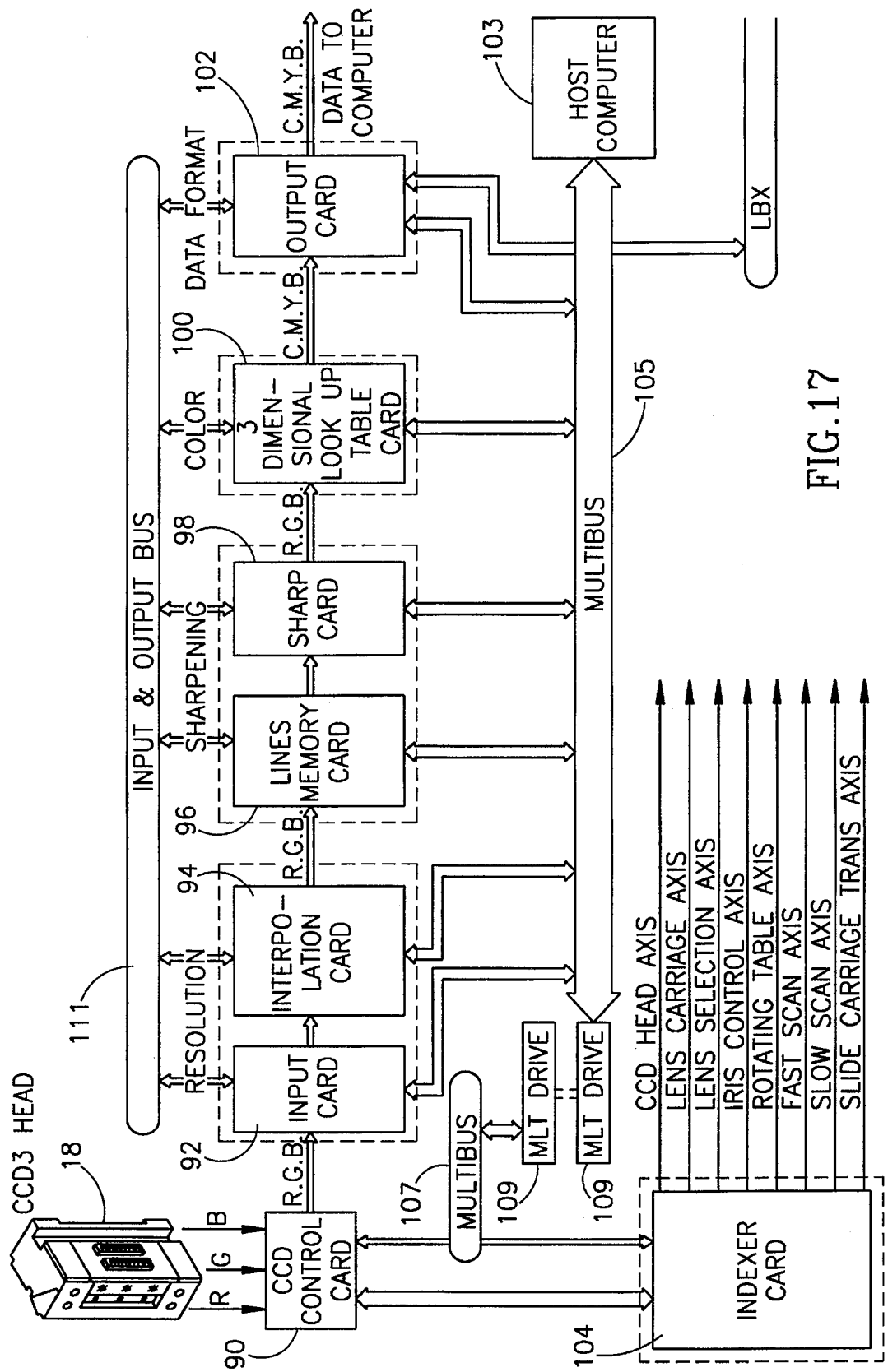
FIG. 17 is an electronic block diagram of the electronic features of the color separation scanner.

FIG. 17 shows an electronic block diagram of the electronic features of the present invention. The color separation scanning head 18 (FIG. 1) provides Red. Green and Blue color separation outputs to and otherwise interfaces with a CCD control card 90. CCD control card 90 provides Red. Green and Blue color separation outputs to resolution determination circuitry including an input card 92 which in turn outputs to an interpolation card 94.

The output of resolution determination circuitry, in the form of Red, Green and Blue color separation signals, is supplied to adaptive sharpening circuitry including a fines memory card 96, which outputs to a sharpening card 98. The output of sharpening card 98 in the form of Red, Green and Blue color separation signals, is supplied to color determination circuitry including a 3 dimensional look up-table card 100.

The output of three dimensional look-up table card 100 is supplied as Cyan. Magenta, Yellow, and Black color separation signals to data format circuitry, including an output card 102. Data format output card 102 provides the Cyan, Magenta, Yellow and Black color separation signals in required format to a host computer 103 for storage and further processing. The host computer 103, which stores the Cyan, Magenta, Yellow and Black color separation signals is outside of the scope of the present invention, and is typically a computer based on an Intel 80286. such as a Scitex Softproof work station manufactured by Scitex Corporation Ltd. of Herzlia, Israel.

An indexer card 104 interfaces with CCD control card 90 for control purposes and provides a plurality of control outputs, indicated in FIG. 5.

Each of the above described cards 92–102 is connected to a multibus 105. CCD control card 90 and indexer card 104 are each connected to a multibus 107. Multibusses 105 and 107 are interconnected via MLT driver circuits 109, associated with each multibus. Each of cards 92–102 is connected additionally to an input and output bus 111, which provides communication between the various cards. Output card 102 may additionally be connected to an LBX bus for communication with an external computer.

Figure 18:
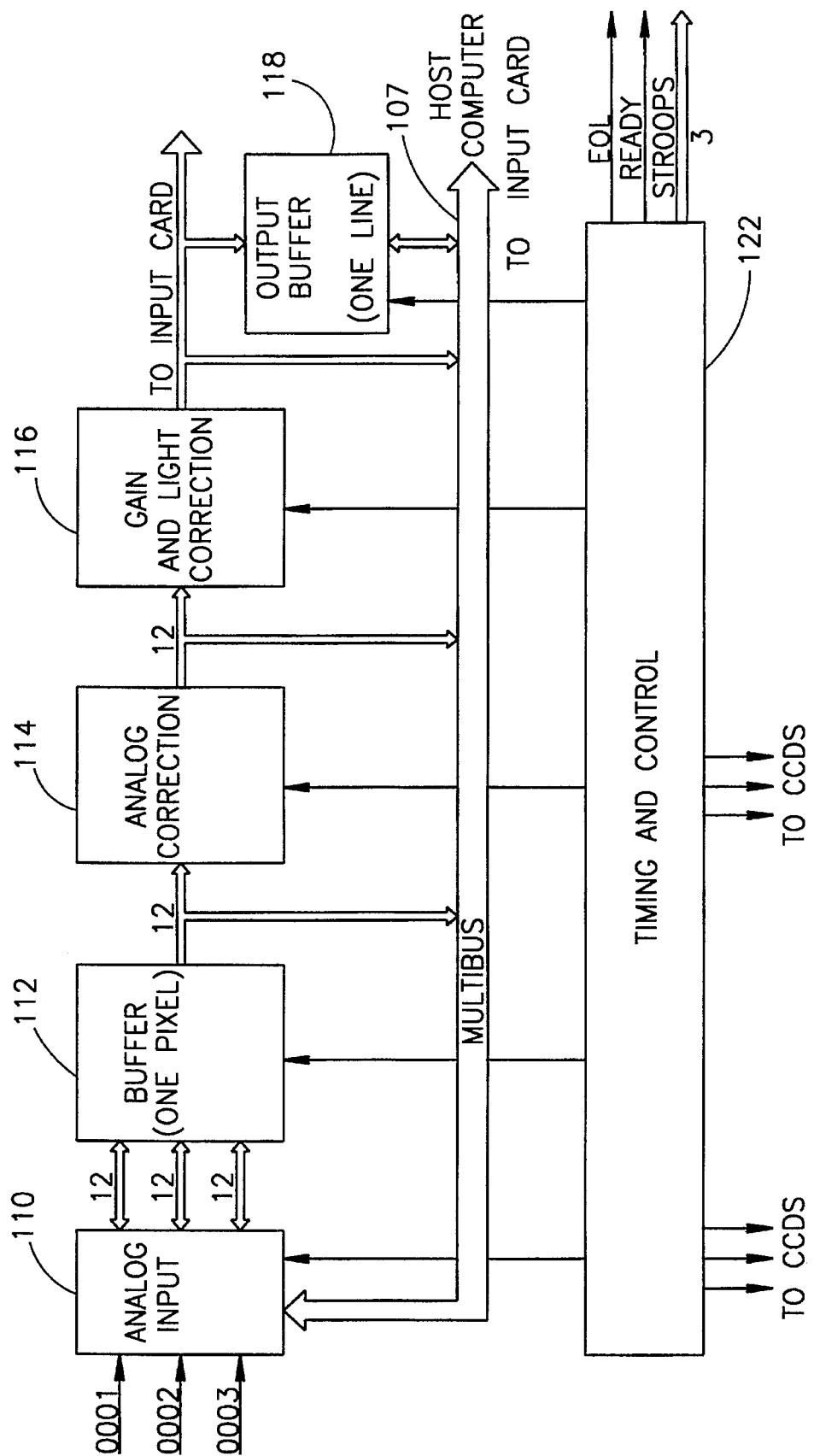
FIG. 18 is a simplified block diagram of the CCD control card employed in the apparatus of FIG. 17.
Figure 20B:
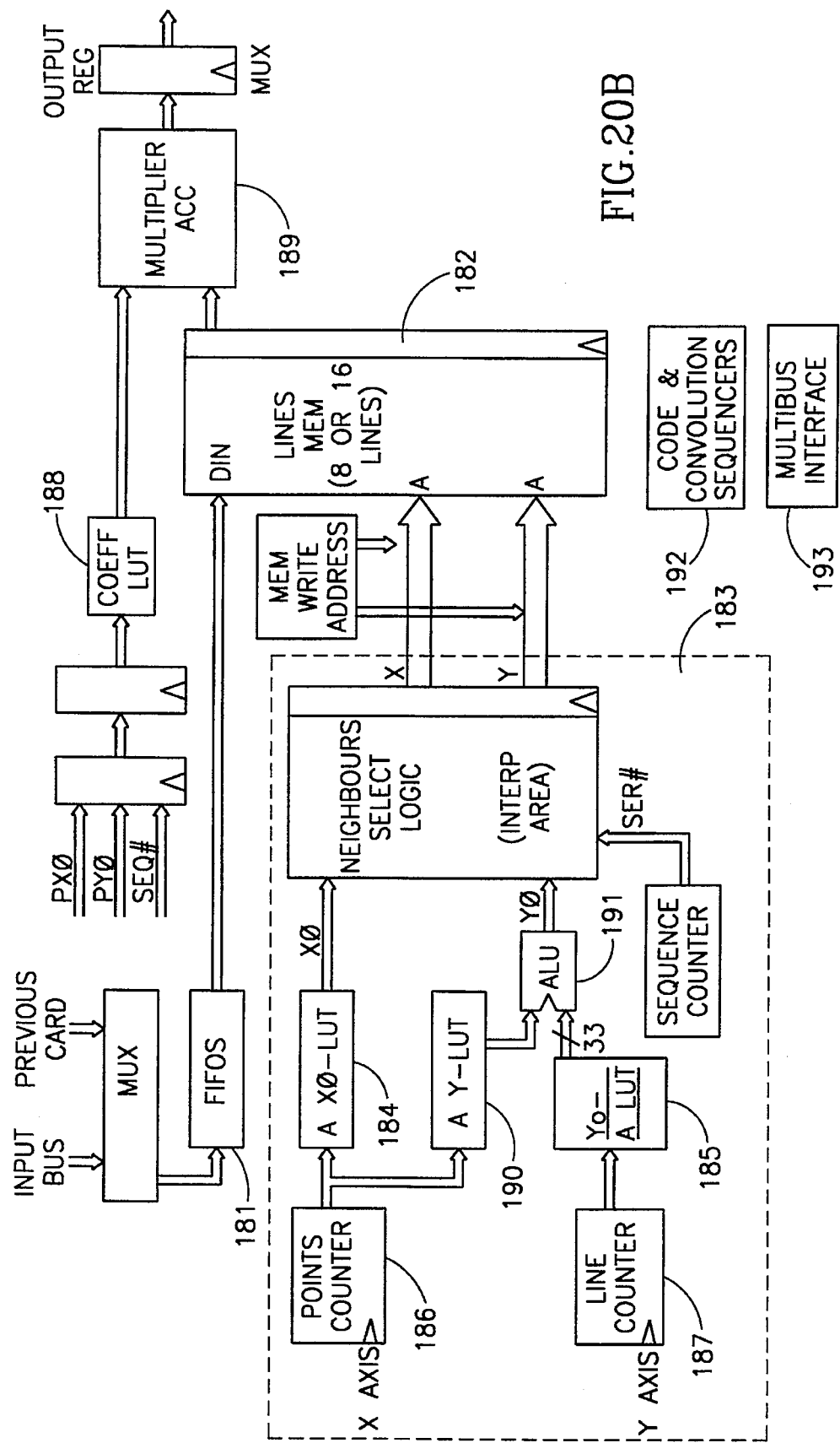
Figure 20C:
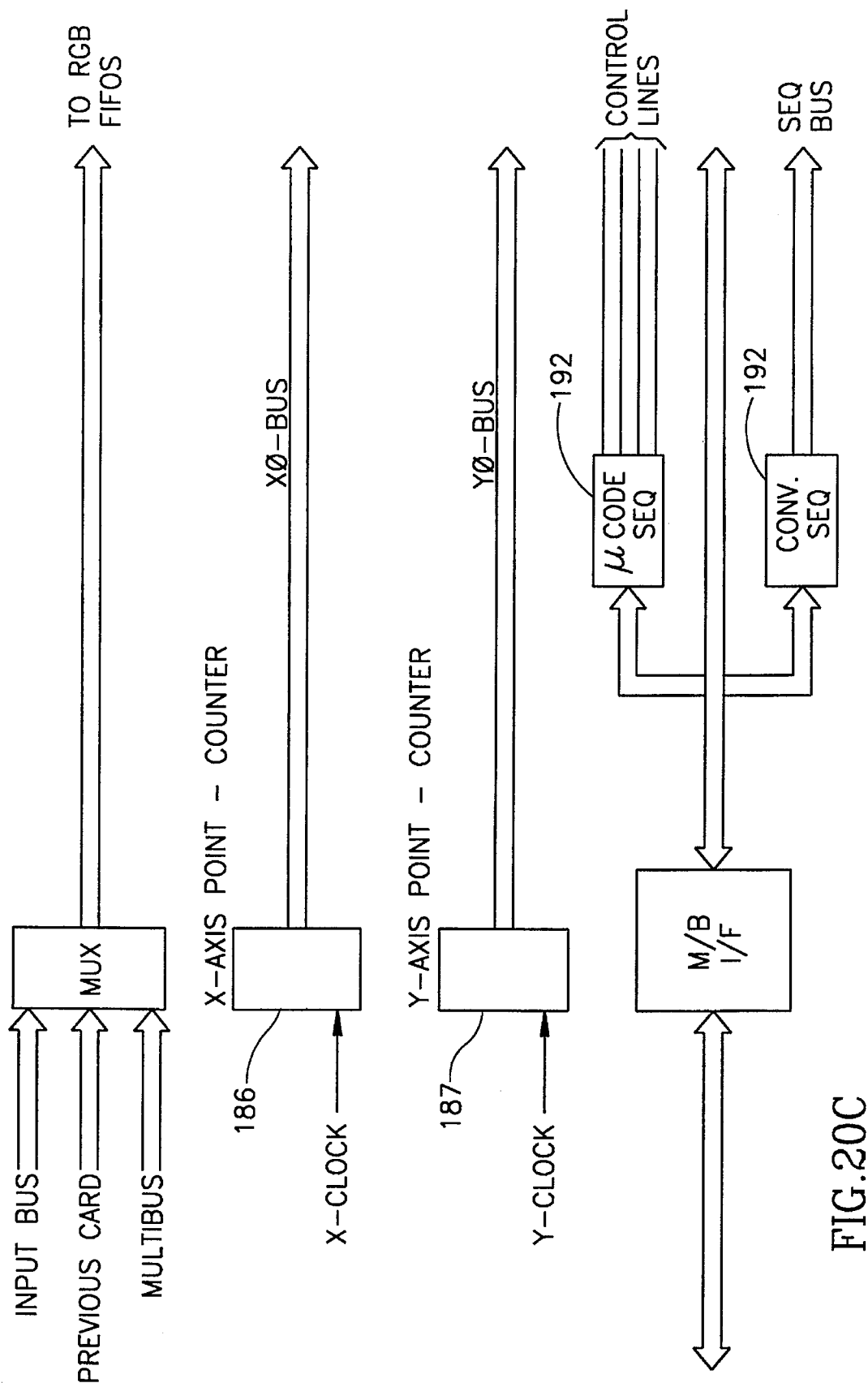
Figure 20D:
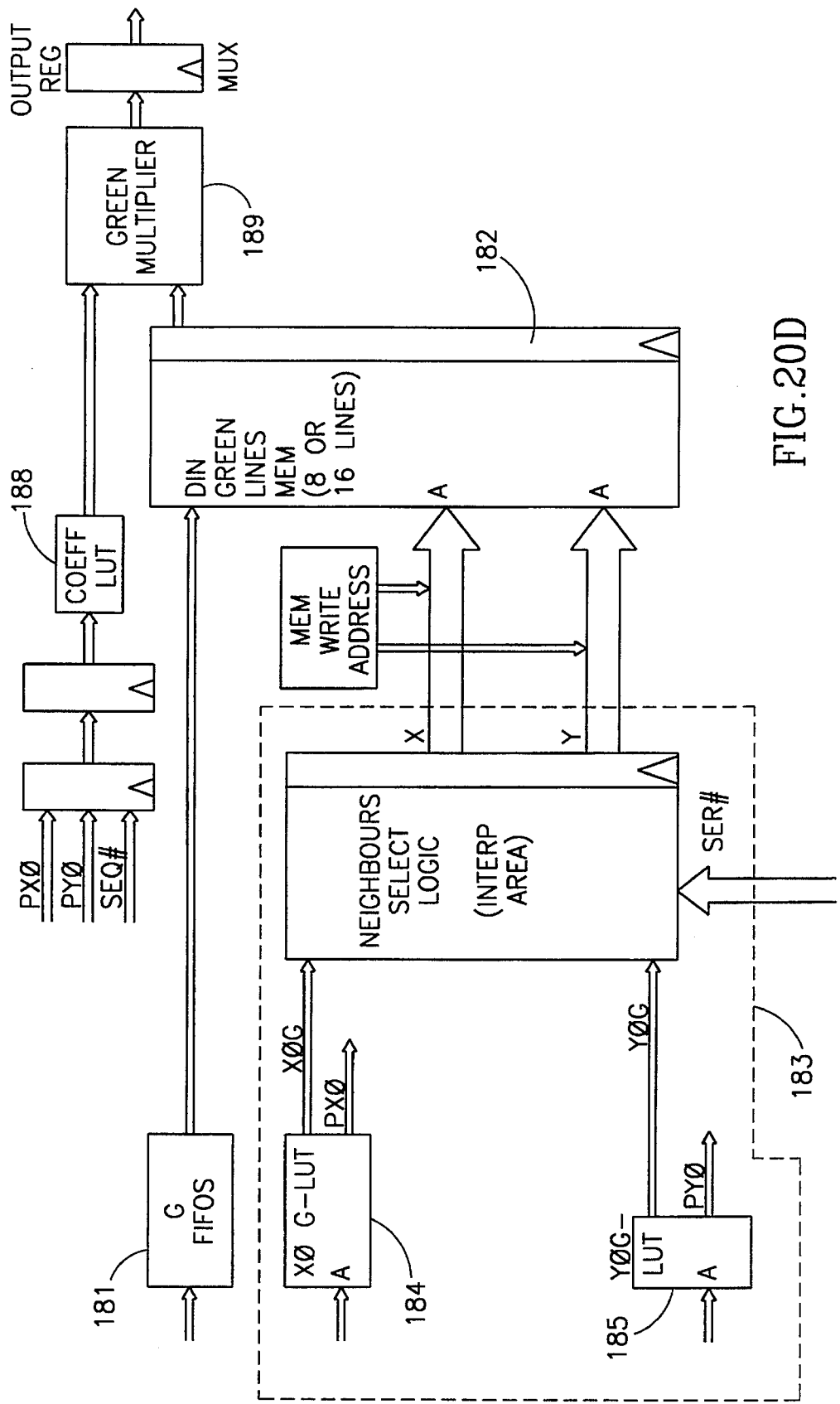
Figure 20E:
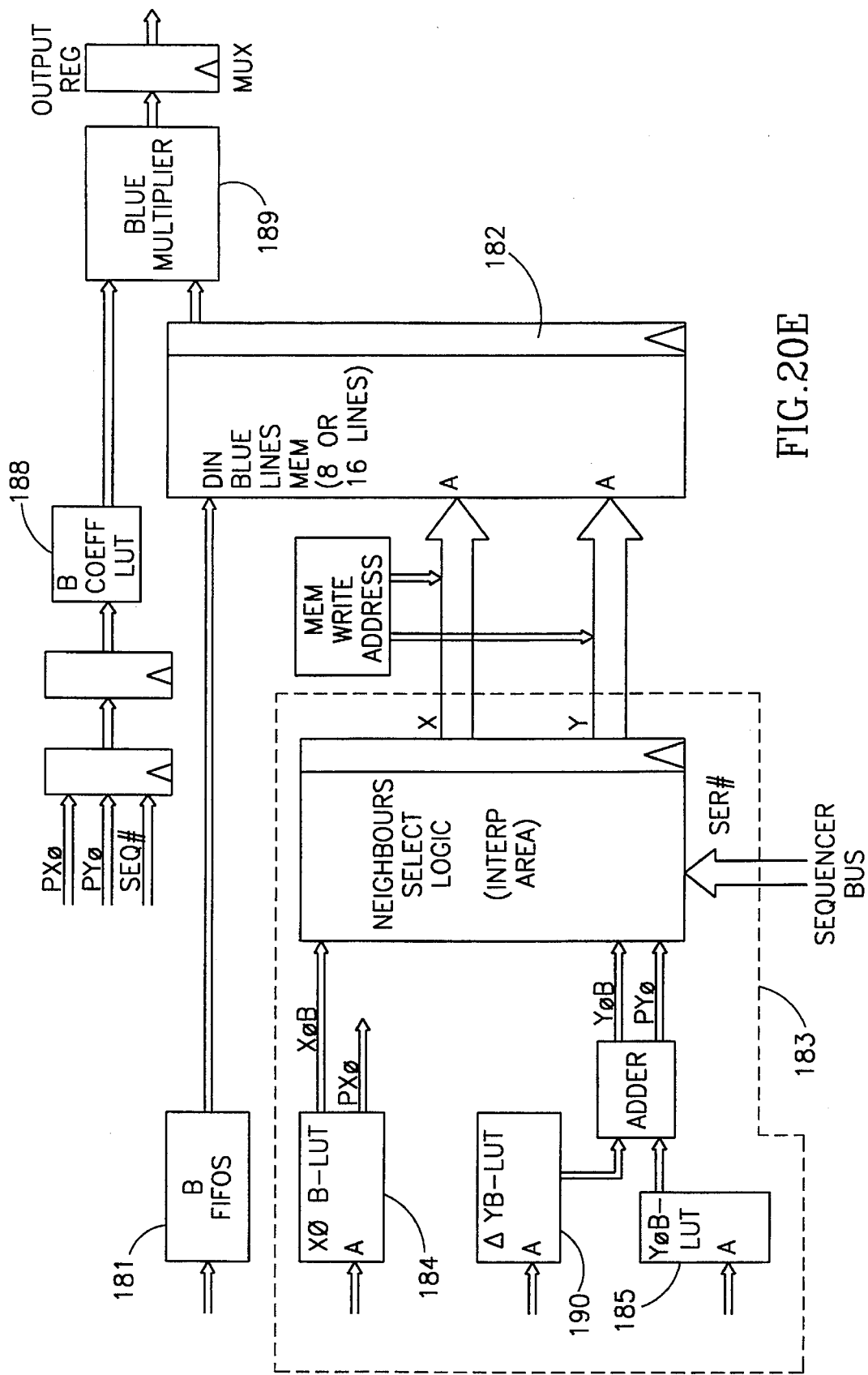
Figure 20F:
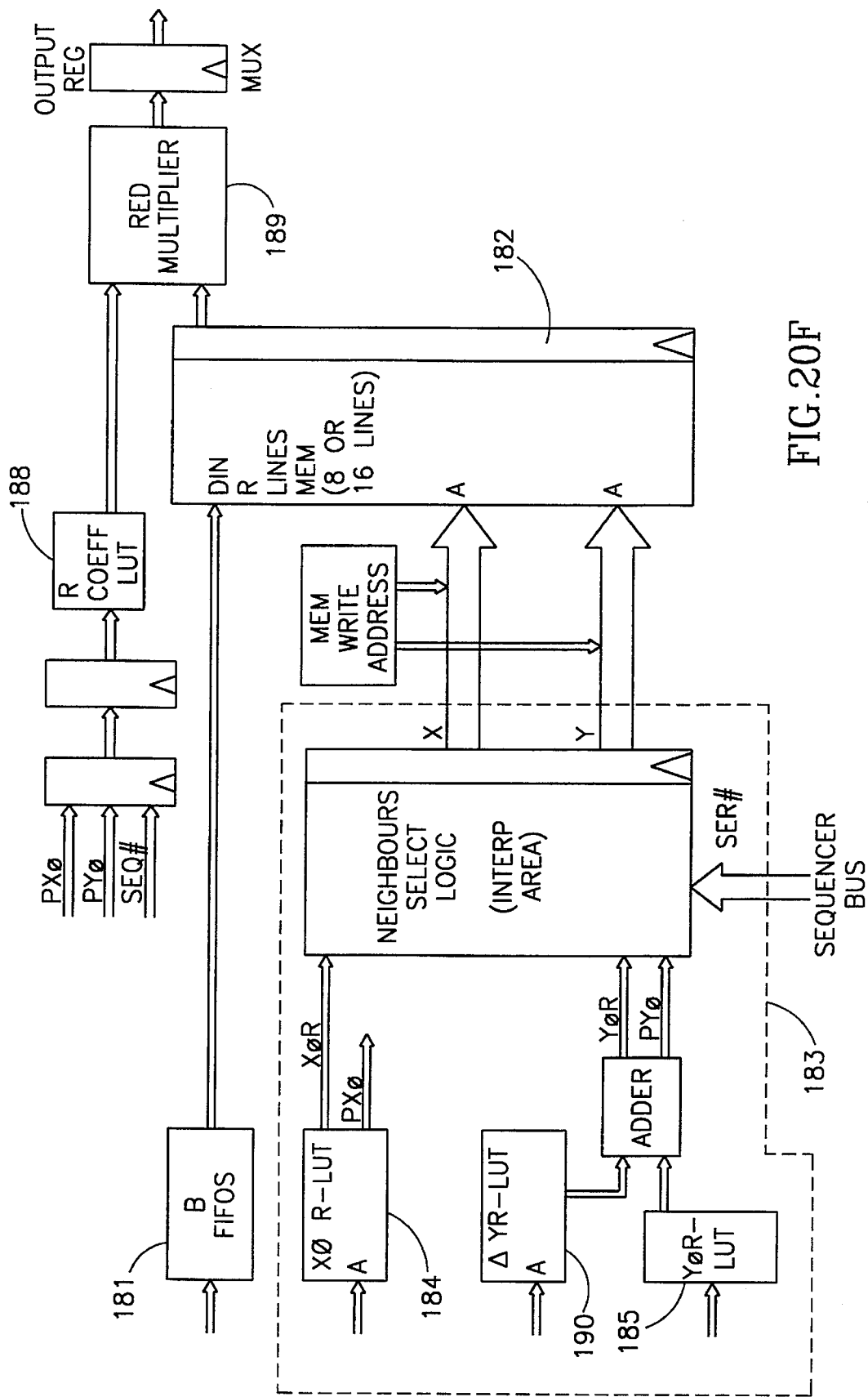

CCD control card 90 is illustrated in simplified block diagram form in FIG. 18 and in more detailed block diagram form in FIG. 19. It is seen that the CCD control card 90 includes analog input circuitry 110, which receives three video inputs from the Red, Green, and Blue CCD arrays, and converts each of them into a 12 bit digital value.

The outputs from the analog input circuitry 110 are supplied to a one pixel buffer 112, which outputs to a dark correction circuitry 114. The output of dark correction circuitry 114 is supplied to a gain and light correction circuitry 116. which in turn outputs to input card 92 (FIG. 17). An output buffer 118, having a one line capacity, also receives an output from gain and light correction circuitry 116 and outputs to multibus 107. A timing and control circuitry 122 provides timing and control outputs to the various circuit elements of the circuitry of FIG. 18 and also to the CCD arrays.

The outputs from the CCD array and are corrected in the CCD Control card 90 for dark and gain offsets caused by the non-uniformity of the CCD arrays. Due to the fact that the individual cells in each CCD have different responses to identical lighting conditions and are also plagued by different dark charge generation characteristics, it is necessary to measure the response of each CCD cell in each array. calculate an average response for all cells, and then apply a correction factor to each cell in order for the total array to provide a uniform response. This correction is carried out under both dark and light conditions as follows:

a. A scan of all the cells in the CCD arrays is carried out in total darkness and the output is sent via multibusses 107 and 105 to the host computer 103. The host computer measures the offset value of each cell, calculates a correction factor for that cell based upon average response of all the cells, and then sends an offset value to the dark correction 114 to be applied to each cell as its output is read during normal scanning.

b. The same procedure is carried out again, but this time the GGD arrays are exposed to a light source at an intensity half of the normal operating value. The computer measures the offset value of each cell, calculates a correction factor for that cell based upon the average response of all the cells, and then transmits an offset value to the gain and light correction circuitry 116 to be applied to each cell as its output is read during normal scanning.

Reference is now made additionally to FIG. 19, which is a detailed block diagram of the CCD control card 90 of FIG. 18. It is seen that the RGB signals from the CCD arrays are fed into 3 identical circuits, one each for the Red, Blue and Green channels. Each circuit comprises an input operational amplifier 124, track and hold sampling circuit 126 and a A/D converter 128.

The operational amplifier 124 in each circuit buffers and conditions the input stream from the CCD array and feeds the output to track and hold sampling circuit 126 which holds the information at a steady state, long enough for it to be processed by the A/D converter 128 directly following. The information is then stored in a buffer 130 where it is analyzed by the host computer 103, and corrected for differences in the response of individual cells to light and dark.

An offset value, provided by the host computer 103, is loaded into a register 132 and processed by a bias D/A converter 134 to provide a DC offset voltage to the input of the operational amplifier 124. This offset is equal to and offsets the operating voltage that drives the CCD array and enables the operational amplifier to measure only the differential voltage at its inputs, corresponding to the output charges of the cells of the CCD arrays.

The input A/D converter 128 of analog input circuitry 110, converts the input stream into 4096 gray levels (12-bit data) and transfers it via buffer 130 to a 16-bit ALU 136, forming part of dark correction circuitry 114 (FIG. 18), which performs dark correction to the original input stream. the one pixel buffer 112 between analog input unit 110 and dark correction circuit 114 (FIG. 18) is in fact embodied in three buffers 130, each of which holds a single pixel of R, G, and B information in a steady state for processing by the dark correction circuitry 114.

Dark correction circuit 114 compensates for differences between the cells of the CCD arrays under dark (absence of light) conditions. During scanning, the host computer loads the dark correction table, calculated during the set-up period of the scanner, into dark memory and the 16-bit ALU 136 adds the offset to each pixel as it is received. The corrected information is transferred to this gain correction circuit for further processing.

Gain and light correction circuit 116 compensates for the uneven distribution of the light source in space and over time and the difference in response between individual CCD cells to the light source. Temporal light factor calibration circuitry 139 provides a calibration factor to correct the gain pixel data for any changes of the light source intensity over time.

During scanning, the host computer loads the pixel offset table, calculated during the set-up period of the scanner, into a gain memory 138. The data stream arriving from analog input circuit 110 is multiplied with the data stored in the gain memory and the resultant corrected signal is transferred via a limiter 140 and output register 142 to one line output buffer 118 (FIG. 18) and a receiver 144.

Output buffer 118 is a single line buffer that receives the corrected information from the CCD arrays and transfers it to the host computer 103 via multibusses 107 and 105. The buffer also allows the host computer to access the information directly, before it reaches the input card 92 for diagnostic purposes or processing by various types of computers. The CCD calibration information is also transferred to the input card 92 for further processing by the scanner circuitry in cards 92–102.

Timing and control of the CCD arrays and of the circuitry in CCD control card 90 is performed by timing and control circuitry 122 (FIG. 6), controlled by the host computer software.

The A bit map containing the addresses of dead cells, semi-responsive cells, light and dark cells in the CCD arrays is loaded by the host computer 103 into a RAM memory 146 in the timing and control circuitry 122. Circuitry 122 in turn acts upon the bit map in the RAM 146 and selects the correct cells for set-up and scanning.

The timing and control circuitry 122 also employs the bit map to provide the control and timing signals to the indexer card 104 (FIG. 5) to position the optical scanning head in the correct place for each scanning line. A control signal from the indexer card informs the host computer 103 when a line has been scanned and that data can be read.

Reference is now made to FIGS. 20A–20F, which together provide a detailed block diagram of input card 92 and interpolation card 94 of FIG. 5. Picture reduction in the scanner is first carried out by the lenses in the optical path and is limited to the type of lens used. Further reduction is carried out electronically by input card 92 and interpolation card 94 as follows:

Pixel data arriving from the CCD control card 90 is averaged by a factor of $2^n \times 2^m$ in both the x- and y-directions.

When the first pixel arrives from the CCD control card 90 it is buffered and loaded into an input select FIFO circuitry 150. A FIFO circuit is provided for each of the Red, Blue and Green channels. The value of the pixel is then written by a Writable Control Storage (WCS) element 151 into a FIFO register 152.

A microprogram in the WCS 151 strobes the first input pixel from the FIFO register 150 via an ALU 154 to a lines memory 172. The pixel then waits for the next input pixel to be available at the output of the corresponding FIFO. When the pixel becomes available, the microprogram reads it from the FIFO register 152 and sends it to the ALU 154.

At the same time, the first pixel is moved via a memory register 158 back into the ALU 154, where it is accumulated with the second pixel and then sent back to the lines memory 172. This process is repeated until the number of pixels determined by a preselected reduction factor is reached. The process is repeated again for each group of pixels until end of the line is reached.

A gradation look-up table (LUT) 160 applies gray scale correction to the data stream according to a table downloaded from the host computer 103. The corrected information is then transferred via a next card buffer 162 to another card in the system via the bus 11.

A microprogram downloaded from the host computer 103 into the WCS 151 controls the operation and timing of input card 92.

Two circuits, a maximum detector 164 and a saturation detector 166, are located between the FIFO register 152 and the ALU 154 and are operative to measure the maximum value of the input pixels and to count how many pixels reached a predetermined saturation level. Those two circuits are not able to differentiate between R. G, and B pixels and are operative to provide a value for either single line or a whole picture. The information derived is for set up purposes only and is not used during normal scanning.

A control register 170 provides an end of line signal, as well as control and clear signals to the saturation and maximum detector circuits 166 and 164 respectively, and to memory address counters 173.

A status register 171 provides the host computer with status information on an interrupt basis.

Each input or output on the input card 92 is connected to multibus 105 via a driver/receiver 176 and allows the host computer to load or read each input or output independently for diagnostic purposes.

For example, a buffer between multibus 105 at the host computer 103 and input FIFO circuits 150 allows data from the host computer to be loaded into the FIFOs for diagnostic purposes. This means that diagnostics can take place without the scanner CCD control card 90 being connected.

A multibus interface 180 arbitrates between the multibus 105 in the host computer 103 and the input card 92. For example, it accepts control data from the host computer and selects the source of the input data. Data may be fed to the input card from three sources: from the CCD Control card 92, from the multibus 105 directly, or from the input bus 111. Control data such as data for magnification, shift, gradation, and WCS microprograms from the host computer are also handled by the multibus interface 180.

The interpolation card 94 performs double functions. One is to correct the optical/mechanical misalignment of the Red, Green, and Blue (RGB) image data separations, and the second is to provide coarse adjustment of image size using electronic interpolation techniques.

The above two operations are performed by interpolating new pixel values from data of neighboring pixels using a two-dimensional convolution technique. Hence, operations can be combined into a single operation to provide the desired result. This is achieved using mathematical preparation algorithms to load look-up tables (LUT) used throughout the image processing.

The first preparation step defines the misregistration of the Red and Blue data with respect to the Green data (which is defined as the reference separation). Since the misregistration occurs on the X axis of the scanner and is unchanged along the Y axis (the scanning axis), mapping is required along that axis only. The second preparation step determines the amount of coarse image adjustment which defines the weight of each of the neighboring pixels. Once the above two operations have been completed, information is loaded into the appropriate LUTs.

Referring to the block diagram of FIGS. 20B–20F, it is seen that interpolation card 94 contains input FIFO's 181 for each of the RGB data separations, all of which are fed from the input card 92 by means of multiplexed data transfer techniques. From the input FIFOs 181, data is loaded into the line buffer memory 182 which typically contains eight lines (extendible to 16 lines) for each one of the RGB separations.

An interpolation processor 183 for each separation calculates the exact corner point location (with an accuracy of 1/16 of a pixel) of the interpolated area matrix. This is carried out differently for the Green separation as compared with the Red and Blue separation because the Green separation does not undergo misalignment corrections, in view of the fact that it serves as the reference.

For the Green separation, the corner point coordinates are taken directly from XO and YO LUTs 184 and 185 respectively, which are addressed by the X axis point counter 186 and the Y axis line counter 187, to determine the corrected address of the corner pixel within the line memory 182.

The fraction portion of the location being interpolated (PXO, PYO) is used to address coefficient LUTs 188 which provide a multiplier 189 with the appropriate weight for every individual pixel used in the convolution matrix. The sum of all the multiplications of the convolved area is the final corrected pixel which is then multiplexed outside the interpolation card via output bus 111.

Registration of the Red and the Blue separations with respect to the Green separation is achieved by the provision of a delta y LUT 190 and an ALU 191 for each of the Red and Blue separations. This enables fine correction along the Y axis which is calculated in real time during interpolation along the X axis (i.e. the CCD pixel axis).

Sequences 192 are provided to control the operation of the interpolation cards. One of the sequences 192, termed the micro-code sequencer, controls the overall operation of the interpolation card and the writing operation into the appropriate line memory 182. A second sequencer 192, termed the convolution sequencer, controls only the calculation operation needed for convolution.

A multibus interface 193 provides coordination between the interpolation card buses and the host computer 103 before and after interpolation process and can also be used for diagnostic purposes.

The sharpening circuitry typically comprises two cards, lines memory card 96 and sharpening card 98.

The sharpening card 98 performs all the picture sharpening mathematical functions on data received from the input card 92 or interpolation card 94. The lines memory card 96 supplies the sharpening card 98 with the intensity value of the central pixel being operated on and with a matrix of intensity values of neighboring pixels.

Figure 21:
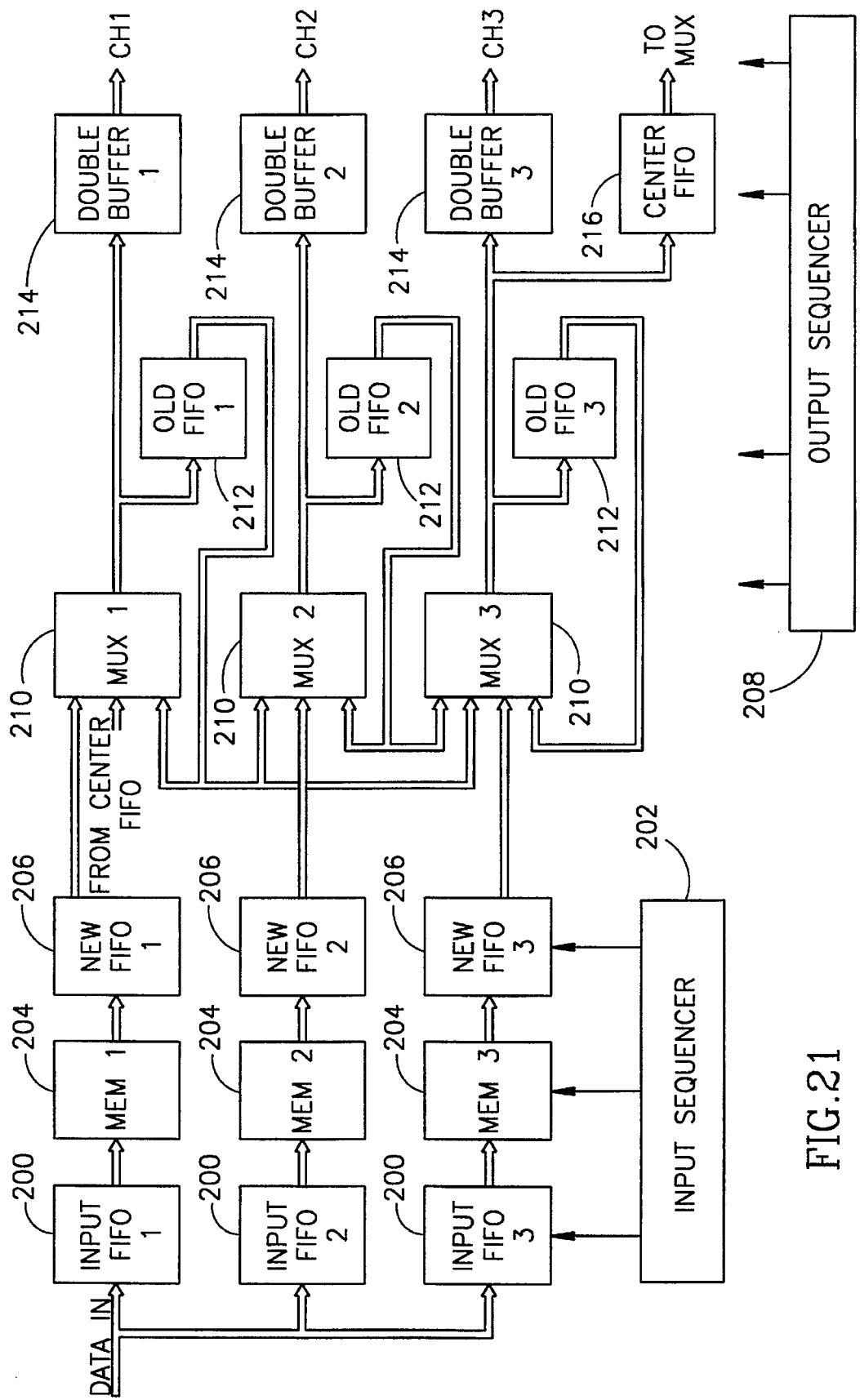
FIG. 21 is a simplified block diagram of the lines memory card forming part of the apparatus of FIG. 17.
Figure 22:
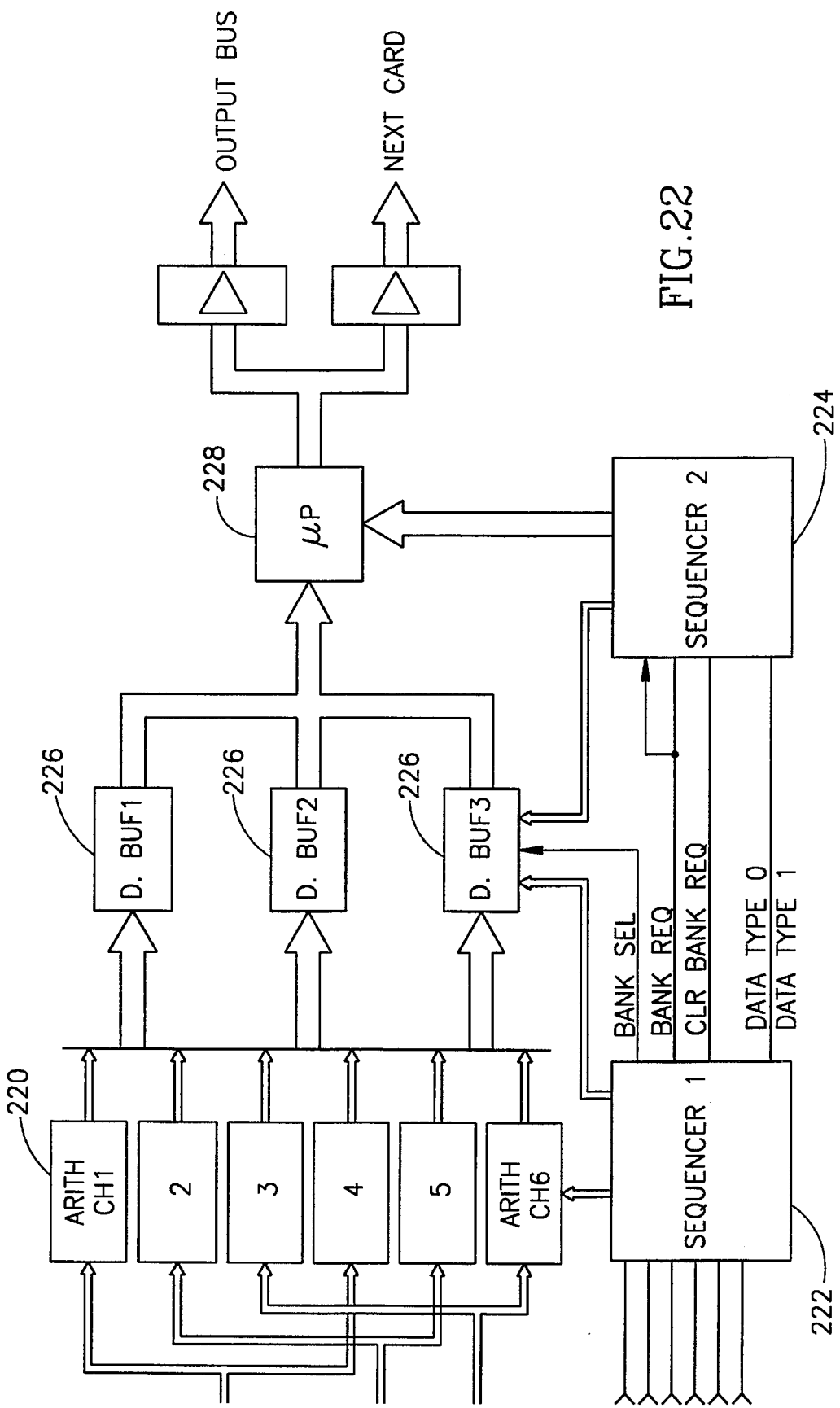
FIG. 22 is a detailed block diagram of the sharpening card employed in the apparatus of FIG. 17.

Reference is now made to FIGS. 21 and 22 which describe lines memory card 96 and sharpening card 98. When the sharpening card receives the pixel matrix from lines memory card 96 it begins to calculate the average value of each pixel matrix about the central pixel in the matrix and compares it with the values of the pixels surrounding it in order to determine the location of the edge of the unsharpened picture. The sharpening card then subtracts the central pixel value previously calculated from the incoming data to sharpen the edges of the picture inside the matrix.

A number of factors enter into the calculation. The color, the contrast, and the brightness of the area surrounding the central pixel all affect the sharpness of the picture. The brightness and color (luminance and chrominance) are calculated as linear transformations of the original RGB signal arriving at the sharpening card. The contrast is calculated as a sum of all the local edges in the matrix.

Data from the input card 92 or the interpolation card 94 is fed to the inputs of three input FIFO circuits 220 (FIG. 9) in the lines memory card 96. Multiplexed data, defined on the input bus 111 and controlled by signals from the input card 92 or interpolation card 94. separates input information into three separate R, G, and B signals and loads them into the three input FIFOs 200 respectively.

An input sequencer 202, controlled by a microprogram downloaded from the host computer 103, the R. G. and B data into three memories 204, MEM 1. MEM 2, and MEM 3. and then unloads the data into a series 206 of FIFOs called NEW FIFOs.

A first cycle of an output sequencer 208 unloads the NEW FIFOs 206 via multiplexers 210 into three further FIFOs 212 termed. OLD FIFOs. An output sequencer 208 also sends the same data via a set of double buffers 214 at the output of the lines memory card 96 to the sharpening card 98.

The next cycle of the output sequencer 208 refreshes the OLD FIFOs 212 with new data from the matrix transmitted by the NEW FIFOs 206. This data consists only of data that was not in the previous matrix. In other words, the FIFOs 212 are not completely cleared and then refreshed, but instead they are filled only with new data. The previous data which is still valid remains during the refresh. This method eliminates any time consuming overheads arising from memory intensive operations.

Multiplexer 210 allows the selection of a specific channel of RGB data to be used as a basis for the separation and sharpening of the other color channels. Usually, the Green channel is used as basis for the other separations, but by juxtaposing the addresses of the other channels, both the Blue and Red can be used alternatively as a basis.

A center FIFO 216 allows the center data of the governing matrix to be passed onto the other two colors as an index for the location and registration of the matrices so that the sharpening factor can be added at the correct point.

Each one of the three data channels from the lines memory card 96 buffers is fed into the inputs of two arithmetic units 220 (FIG. 10) located at the input of the sharpening card 98 as follows:

Channel 1—arithmetic units 1 and 4.
Channel 2—arithmetic units 2 and 5.
Channel 3—arithmetic units 3 and 6.

In the first pass, the arithmetic units calculate the unsharp values of the input data, at the second pass they calculate the contrast values, and at the third pass they calculate the color values.

Figure 24:
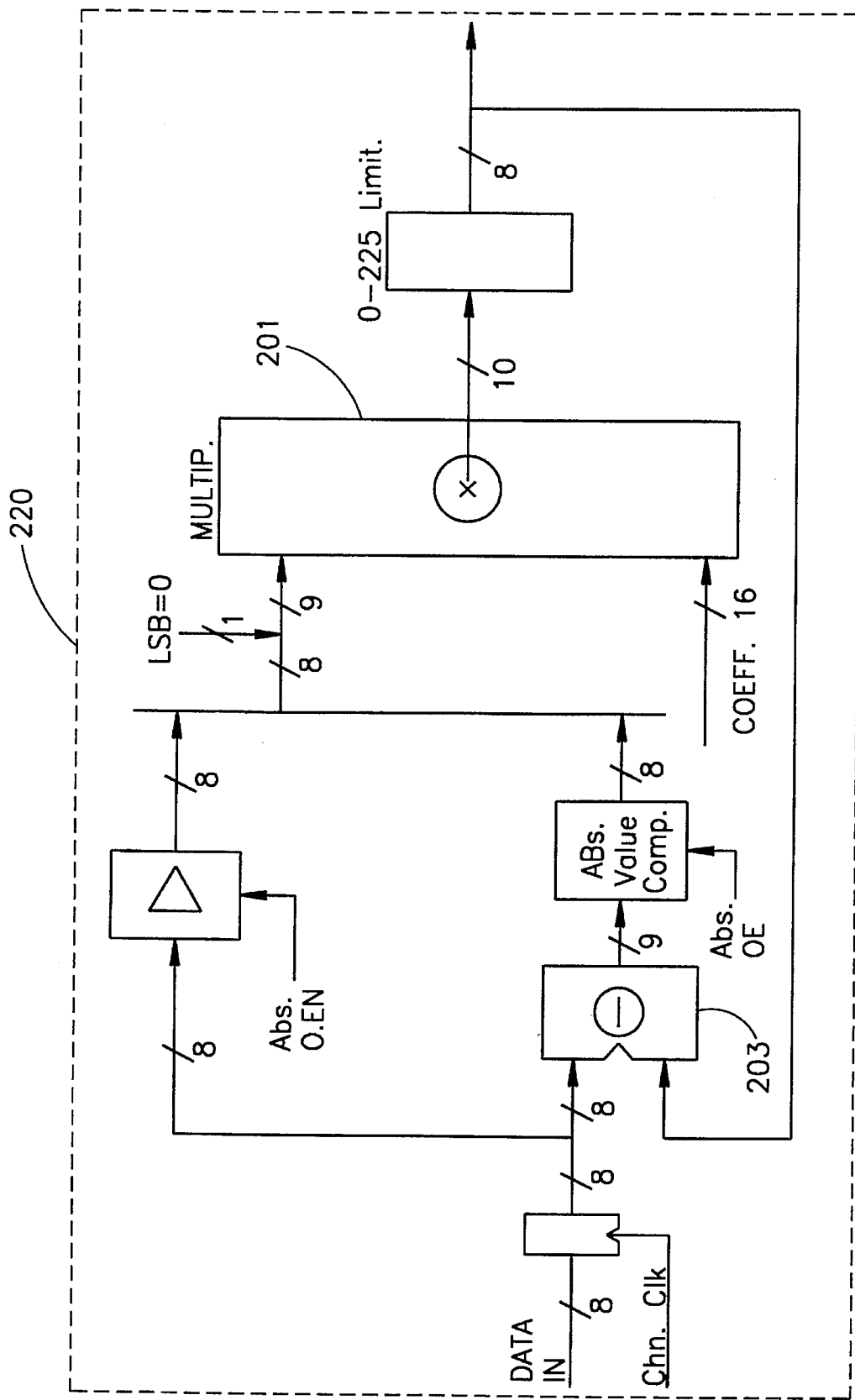
FIG. 24 is a detailed block diagram of a multiplication channel employed in the apparatus of FIG. 22.

Reference is now made to FIG. 24, which describes the arithmetic unit 220. Data is fed from lines memory card 96 directly to a multiplier 201. The summation of pixel matrix element values is performed and the average value thereof is then determined. This data is then transferred to an ALU 203 and is subtracted from the raw data of the same matrix.

Figure 23:
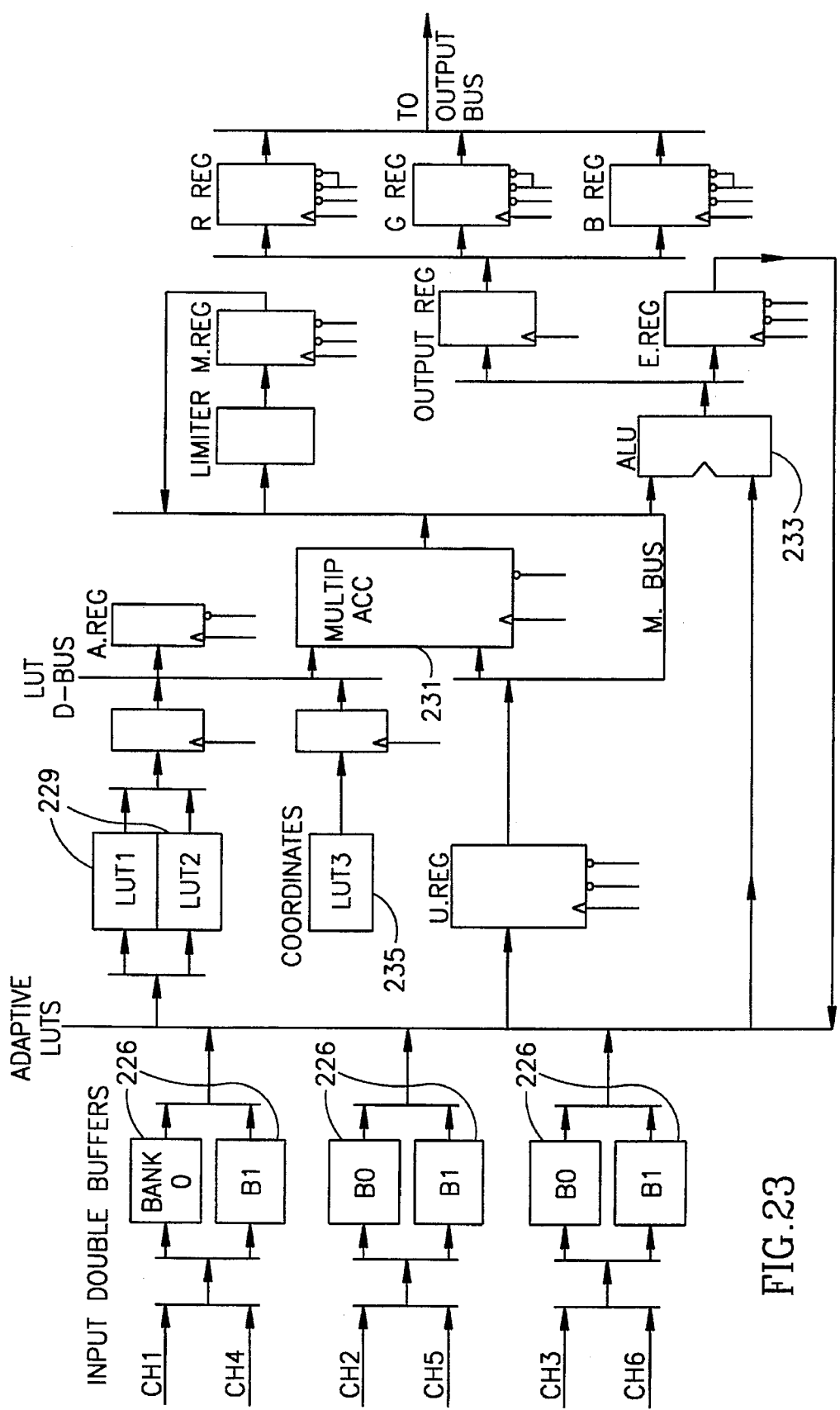
FIG. 23 is a detailed block diagram of the microprocessor employed in the apparatus of FIG. 22.

The result of this operation is a matrix whose values represent the deviation of the value of each pixel from the average value. This matrix, together with the average value, are transferred to a bank of input double buffers 226 (FIG. 23). The same hardware can also perform a transformation to a different color space (e.g. LHS) using a different set of coefficients.

Sequencers 1 and 2, indicated by reference numerals 222 and 224 (FIG. 10), respectively, control the timing, sequence, and flow of data on the sharpening card. Once the data has been processed by the arithmetic units 220, the sequencers 222 and 224 pass the data to double buffers 226, where the data is stored temporarily for use by a microprocessor 228.

Referring now to FIG. 23, it is seen that microprocessor 228 comprises adaptive LUTs 229, a coordinate LUT 235, a multiplier 231, and an ALU circuit 233 that calculates the final output value of the card.

The information processed by the arithmetic units 220 (FIG. 10) is fed simultaneously to LUTs 229 and to the ALU 223. LUT 229 provides the correction factors for color, brightness, contrast, and edge, and then passes them on to the multiplier 231. Multiplier 231 applies the correction factors to the data and then passes the corrected data to the ALU 233. Data from a coordinate LUT 235 controls the sharpening factor and its dependence on the location of the feature to be sharpened. The ALU 233 performs the final addition and subtraction of the data and the sharpened data is finally sent to the 3 dimensional look-up table card 100 (FIG. 5).

Figure 25:
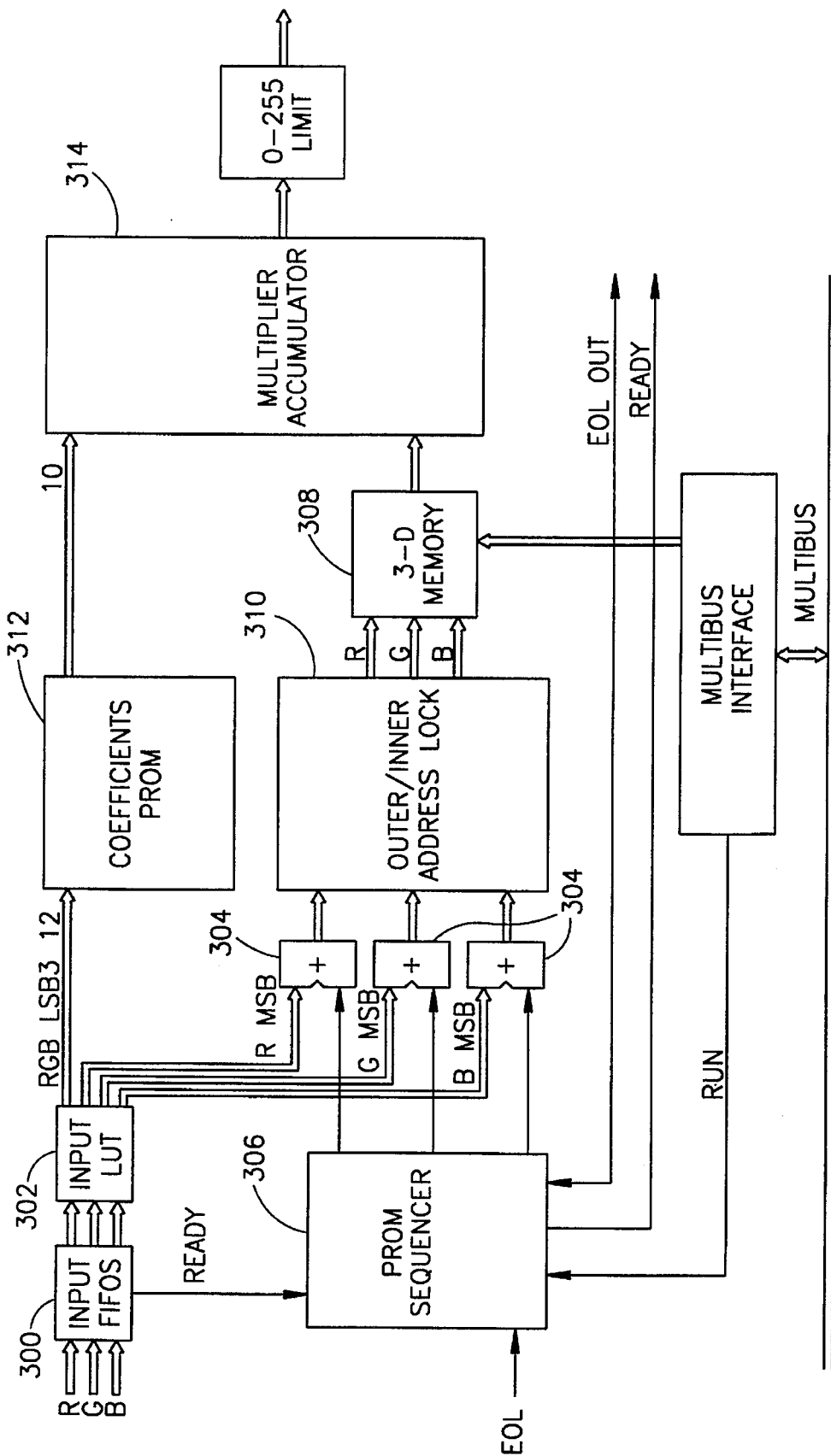
FIG. 25 is a detailed block diagram of a 3-dimensional look-up table card employed in the apparatus of FIG. 17.
Figure 26:
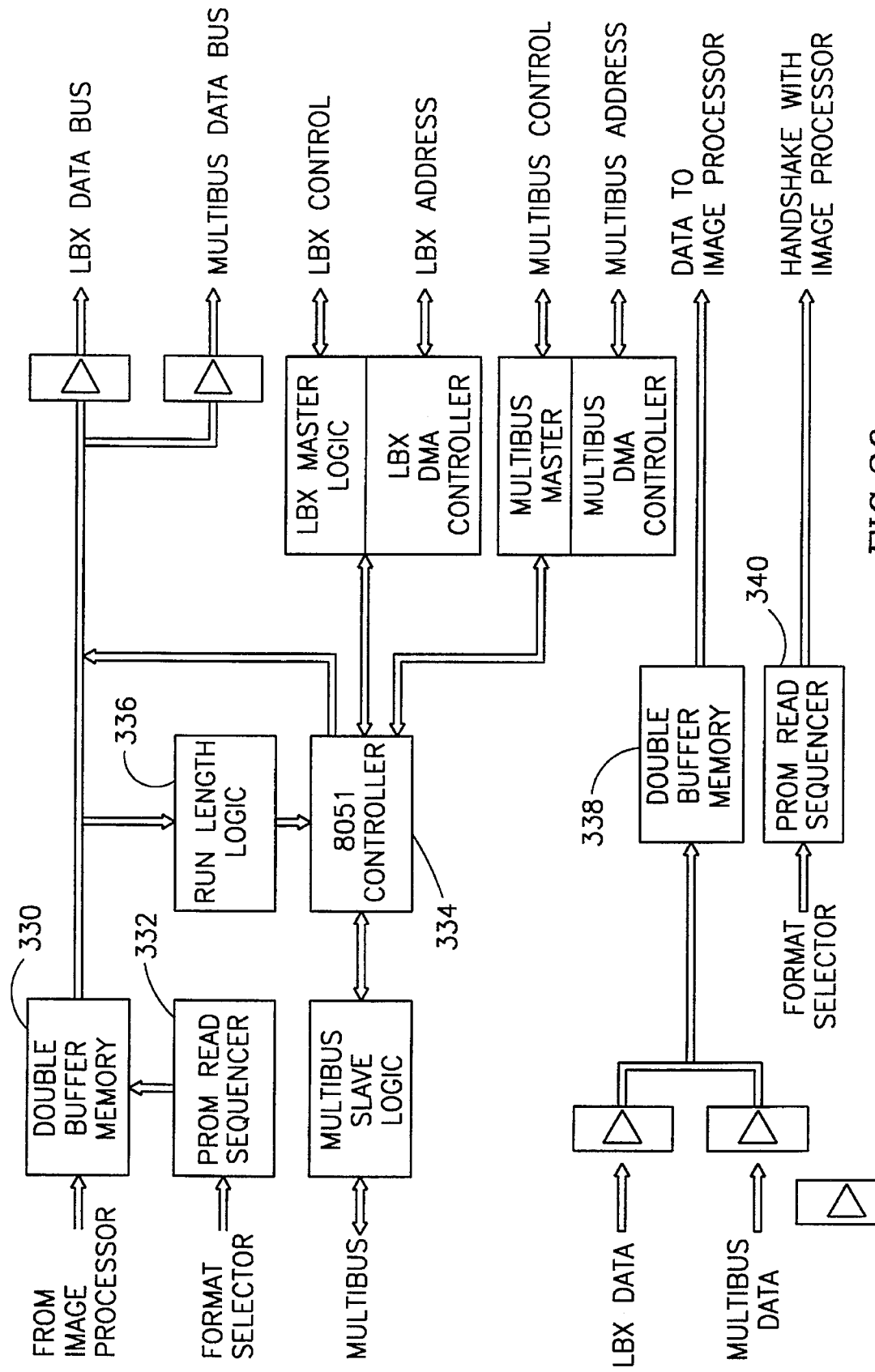
FIG. 26 is a detailed block diagram of an output card employed in the apparatus of FIG. 17.

Reference is now made to FIG. 25 which is a detailed block diagram of a 3-dimensional look up table (LUT) card 100. Color processing is performed by the 3-D LUT card 100 which also performs the following functions:
—RGB to CMYB conversion.
—CMYB to RGB conversion.
—CMYB gradation.
—Division of color space into discrete linework colors.
—Translation of RGB signals into any required color space such as XYZ or LHS (luminance, hue, saturation) by using an interpolation process.

Information from the previous card (input card 92, interpolation card 94, lines memory card 96, or sharpening card 98) enters an input FIFO 300 and passes through an input LUT 302, which performs gradation of data. The four most significant bits of each separation (Red, Green and Blue) serve as pointers which define the eight corners of a cube centered about the required point in a three dimensional color space. These corners are calculated by ALUs 304 and are controlled by a PROM sequencer 306.

Each one of the eight corners serves as an address for a 3-D memory 308, addressed by an outer/inner address logic 310. The four least significant bits of every separation serve as addresses for a coefficient table stored in a PROM 312. This table defines the weighting of each corner point of the aforesaid color cube about the calculated pixel color value.

The actual point value is obtained by summing each corner point multiplied by its proportional weight. This operation is performed in a multiplier-accumulator 314. it is noted that a separate 3-D memory 308 and a separate multiplier-accumulator 314 is provided for each one of the output color separations, Cyan, Magenta, Yellow and Black.

Reference is now made to FIG. 14 which illustrates, in block diagram form, the output card 102 (FIG. 5). The output card serves to provide communication between the scanner and a multibus or an LBX bus. Information from any of the previous cards 92, 94, 96, 98 and 100 is written into one of the banks of a double buffer memory 330, while information is read out from the other bank to the LBX bus or a multibus.

Information can be organized inside the buffer or can be read out in several forms, for example, 8-bit unpacked, 8-bit packed, 12-bit unpacked, or 12-bit packed. The particular organization is controlled by the PROM read sequencer 332 according to a format loaded from the host computer 103.

An Intel 8051 controller 334 governs the communication between the output card 102 and one of the available buses. The particular pixel location along a scanned line is monitored by a run-length logic circuit 336.

Information can also be inputted to the output card 102 from the host computer 103 via the LBX or multibus. This is shown .automatically at the bottom of FIG. 14, where LBX or multibus data is fed into a double buffer memory 338 and is controlled by a PROM read sequencer 340 in a manner similar to that described hereinabove in connection with elements 330 and 332. This data can be returned via input bus 111 to any of the image processing cards 90–100.

Figure 27:
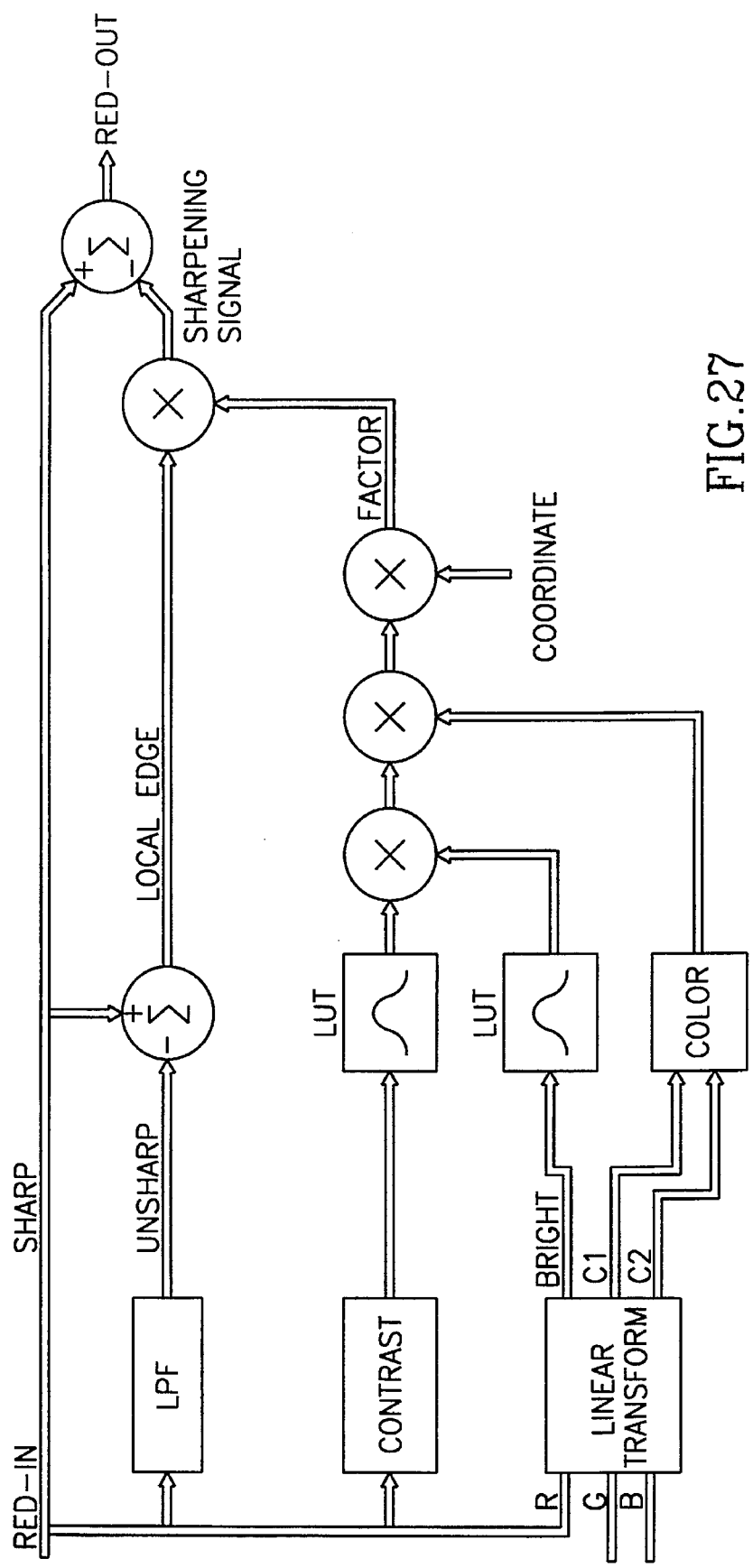
FIG. 27 is a block diagram illustration of apparatus for sharpening pictures.

The adaptive sharpening apparatus of the present invention comprises circuitry of the type illustrated in FIG. 27 for each of the three color separations. The host computer determines the size and shape of the sharp and unsharp features which are emulated by digital processing either automatically or according to instructions from an operator. These features are controlled by loading the appropriate matrix terms into the memory of the arithmetic channels illustrated in FIG. 22.

The adaptive sharpening apparatus may provide color separation of each color separation according to the unsharp values which are calculated on the basis of the available data for that separation. Alternatively all of the separations may be sharpened to correspond with the unsharp values of one particular separation which has been selected by means of the multiplexer units 210 in the Line Memory circuitry illustrated in FIG. 21.

The amount of sharpening at each point of the picture can be adaptively controlled by its intensity, color, location, steepness of the edges and the noise level in the neighborhood of the point. This accomplished by calculating these attributes in the arithmetic channels (FIG. 24) and applying them to the adaptive LUTs (FIG. 23) in the sharpening processor. The noise value to be used in the adaptive sharpening is calculated by an approximation of "standard deviation" formula in the arithmetic, channels (FIG. 24 ).

It will be appreciated by persons skilled in the art that the present invention is not limited to what has been particularly shown and described hereinabove. Rather the scope of the present invention is defined only by the claims which follow.

What is claimed is:

1. A color separation scanner comprising:

a support arranged for mounting thereon a two-dimensional image to be scanned; and color separation sensing means arranged for sensing said two-dimensional image to provide electrical signals representing color separations of said two-dimensional image, said color separation sensing means comprising:

a scanning head located a fixed distance from said two-dimensional image; at least first and second objective lens assemblies; and means for selectively arranging each of said at least first and second objective lens assemblies in a respective fixed location along the optical path between said image and said scanning head, thereby providing at least corresponding first and second optical magnifications of said image onto said color separation sensing means, wherein said scanning head comprises a plurality of generally parallel CCD arrays, and each one of said plurality of said CCD arrays is associated with dichroic filter means and said CCD arrays are disposed in different focal planes.

2. A color separation scanner according to claim 1 and also comprising a fluorescent lamp directly in line with said optical path.

3. A color separation scanner according to claim 1 and also comprising a fluorescent lamp and a light guide.

4. A color separation scanner according to claim 1 and also comprising a source of light providing a light beam and fiber optics to guide said light beam therethrough to said color separation sensing means.

5. A color separation scanner according to claim 1 wherein said CCD arrays are positioned in the scanning head such that each of said CCD arrays is positioned at the best focal plane for the color separation that it senses and wherein said best focal plane is substantially identical for each of said at least first and second objective lens assemblies.

6. A color separation scanner comprising;

a support arranged for mounting thereon a two-dimensional image to be scanned; and color separation sensing means arranged for sensing said two-dimensional image to provide electrical signals representing at least two color separations of said two-dimensional image, said color separation sensing means defining an optical axis and including at least first and second objective lenses each having a multiplicity of focal planes corresponding to said at least two color separations wherein for each of said color separations an intersection of said corresponding focal plane with said optical axis is substantially at the same distance from said image for all of said at least first and second objective lens assemblies.

7. A color separation scanner comprising;

a support arranged for mounting thereon a two-dimensional image to be scanned; and color separation sensing means arranged for sensing said two-dimensional image to provide electrical signals representing color separations of said two-dimensional image, said color separation sensing means comprising:

a scanning head located a fixed distance from said two-dimensional image;

at least first and second objective lens assemblies; and means for selectively arranging each of said at least first and second objective lens assemblies in fixed locations along the optical path between said image and said scanning head, wherein said means for selectively arranging includes means for locating said objective lens assemblies in a nominally fixed location along the optical path between said image and said fixed scanning head and means for fine tuning the location of said objective lens assemblies near said nominally fixed location.

8. A color separation scanner comprising;

a support arranged for mounting thereon a two-dimensional image to be scanned; and color separation sensing means arranged for sensing said two-dimensional image to generally simultaneously provide electrical signals representing color separations of said two-dimensional image, said color separation sensing means including a scanning head located a fixed distance from said two-dimensional image, wherein said color separation sensing means comprises a three-channel CCD imager.

9. A color separation scanner comprising;

a support arranged for mounting thereon of a two-dimensional image to be scanned; and color separation sensing means arranged for sensing said two-dimensional image to provide electrical signals representing color separations of said two-dimensional image, said color separation sensing means comprising:

a scanning head located a fixed distance from said two-dimensional image;

at least first and second objective lens assemblies; and means for selectively arranging each of said at least first and second objective lens assemblies in fixed locations along the optical path between said image and said scanning head including means to expose a line of said two-dimensional image during motion of said means for scanning wherein the resultant width of said line is the inverse of a desired resolution level.

10. A method of color separation scanning of an input image comprising the steps of:

prescanning at least a portion of said input image at least one time for providing output indications of at least brightness of said input image; and scanning said input image in accordance with said at least brightness determined in said prescanning step to provide a full-resolution output indication of color separations of said input picture;

said scanning step including the steps of:

moving a carriage on which said input image is placed a predefined distance while exposing a line of said input image whereby said predefined distance defines a line width which is the inverse of a predetermined resolution level; and holding said input image still until electronic processing finishes.

* * * * *